(12) United States Patent
Loce et al.

(10) Patent No.: US 11,010,088 B2
(45) Date of Patent: May 18, 2021

(54) DYNAMICALLY DETERMINED DIFFERENCE REGIONS APPARATUSES, METHODS AND SYSTEMS

(71) Applicant: Datto Inc., Norwalk, CT (US)

(72) Inventors: Robert Loce, Webster, NY (US); Stuart Mark, Chappaqua, NY (US)

(73) Assignee: Datto, Inc, Norwalk, CT (US)

( * ) Notice: Subject to any disclaimer, the term of this patent is extended or adjusted under 35 U.S.C. 154(b) by 72 days.

(21) Appl. No.: 16/559,598

(22) Filed: Sep. 3, 2019

(65) Prior Publication Data

US 2021/0064243 A1   Mar. 4, 2021

(51) Int. Cl.
*G06F 3/06* (2006.01)
*G06F 12/06* (2006.01)
*G06F 12/02* (2006.01)

(52) U.S. Cl.
CPC ............ *G06F 3/065* (2013.01); *G06F 3/0619* (2013.01); *G06F 3/0673* (2013.01); *G06F 12/023* (2013.01); *G06F 12/0615* (2013.01); *G06F 2212/1032* (2013.01)

(58) Field of Classification Search
None
See application file for complete search history.

(56) References Cited

U.S. PATENT DOCUMENTS

| | | |
|---|---|---|
| 6,785,786 B1 | 8/2004 | Gold |
| 6,847,984 B1 | 1/2005 | Midgley |
| 9,235,582 B1 | 1/2016 | Varadaraju |
| 9,489,267 B1 * | 11/2016 | Patwardhan .......... G06F 3/0683 |
| 9,690,666 B1 | 6/2017 | Shembavnekar |
| 9,811,422 B2 * | 11/2017 | Bushman ............... G06F 16/162 |
| 10,204,016 B1 * | 2/2019 | Patwardhan ........ G06F 11/1451 |
| 2005/0086443 A1 | 4/2005 | Mizuno |
| 2010/0100696 A1 * | 4/2010 | Suzuki .................. G06F 3/0647 |
| | | 711/162 |

(Continued)

OTHER PUBLICATIONS

U.S. Appl. No. 16/055,347.

(Continued)

*Primary Examiner* — Tracy C Chan
(74) *Attorney, Agent, or Firm* — Hanchuk Kheit LLP; Walter G Hanchuk

(57) ABSTRACT

The Dynamically Determined Difference Regions Apparatuses, Methods and Systems ("DDDR") transforms backup configuration request, backup data read response inputs via DDDR components into backup configuration response, changed blocks update request outputs. A write command for a data block to write to a data volume is detected. A data volume address of the data block is determined. A superset range associated with the data volume address is determined. Upon determining that the written-to flag of the superset range is set: extend a previously established written-to subset range within the superset range to include the data volume address when it is determined that the data volume address is not within the previously established written-to subset range. Upon determining that the written-to flag is not set: set the written-to flag and establish a new written-to subset range within the superset range that includes the data volume address. Execute the write command.

22 Claims, 7 Drawing Sheets

(56) References Cited

U.S. PATENT DOCUMENTS

| | | | |
|---|---|---|---|
| 2011/0282841 A1* | 11/2011 | Saika | G06F 3/0608 |
| | | | 707/649 |
| 2013/0226870 A1* | 8/2013 | Dash | G06F 11/2076 |
| | | | 707/634 |
| 2016/0011790 A1 | 1/2016 | Rostoker | |
| 2016/0147607 A1* | 5/2016 | Dornemann | G06F 16/188 |
| | | | 711/162 |
| 2016/0179419 A1* | 6/2016 | Yamaguchi | G06F 3/0683 |
| | | | 711/162 |
| 2017/0091047 A1 | 3/2017 | Bangalore | |
| 2017/0293628 A1 | 10/2017 | Adler | |
| 2018/0173596 A1 | 6/2018 | Petracca | |
| 2018/0239555 A1 | 8/2018 | Cao | |

OTHER PUBLICATIONS

U.S. Appl. No. 16/285,189.
U.S. Appl. No. 16/391,205.
U.S. Appl. No. 16/391,243.
U.S. Appl. No. 16/424,469.
U.S. Appl. No. 16/442,514.
U.S. Appl. No. 16/559,598.
U.S. Appl. No. 16/661,881.
U.S. Appl. No. 16/661,934.
U.S. Appl. No. 16/661,936.
U.S. Appl. No. 16/837,992.
U.S. Appl. No. 16/837,997.
U.S. Appl. No. 62/541,952.

* cited by examiner

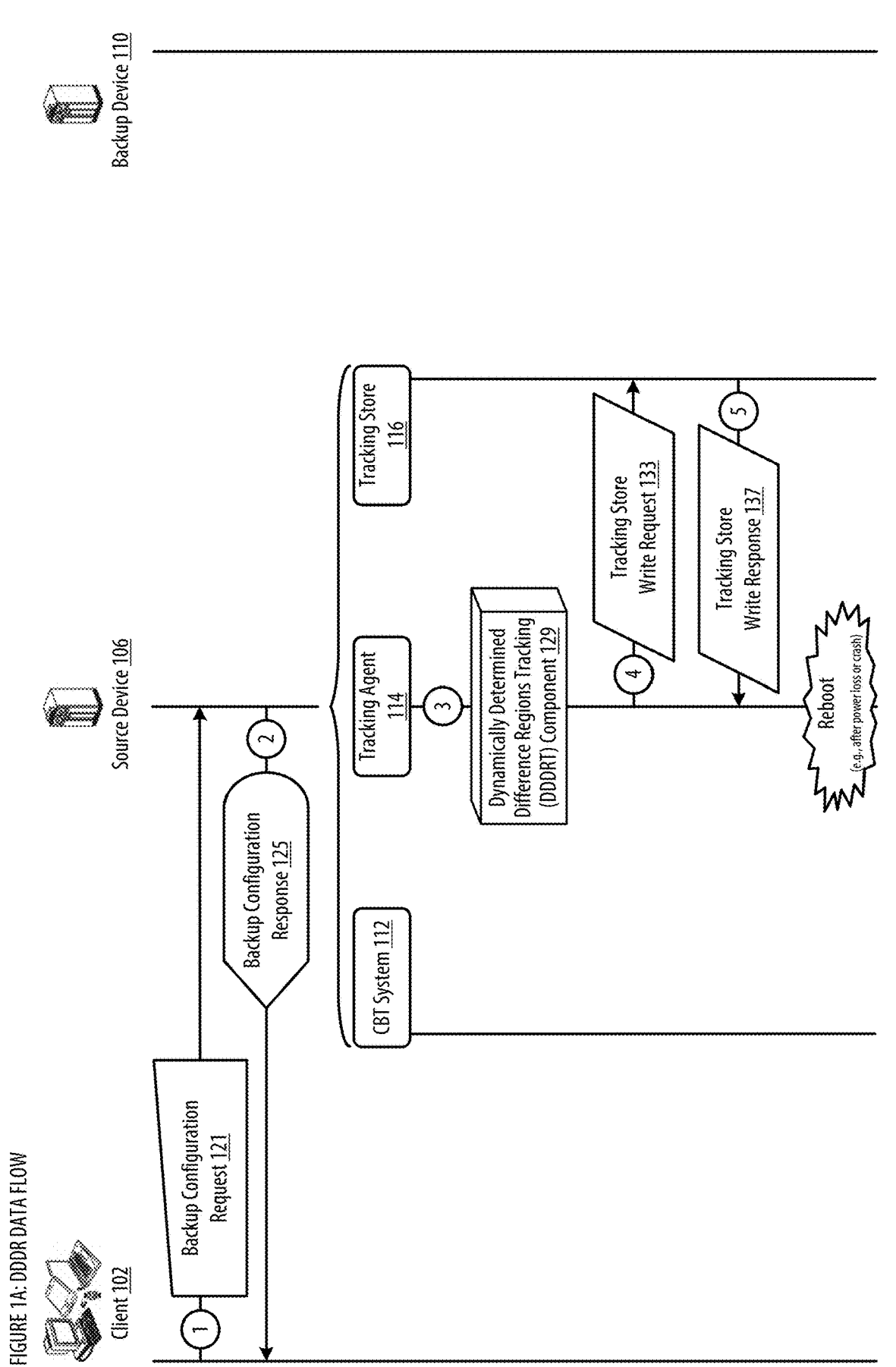

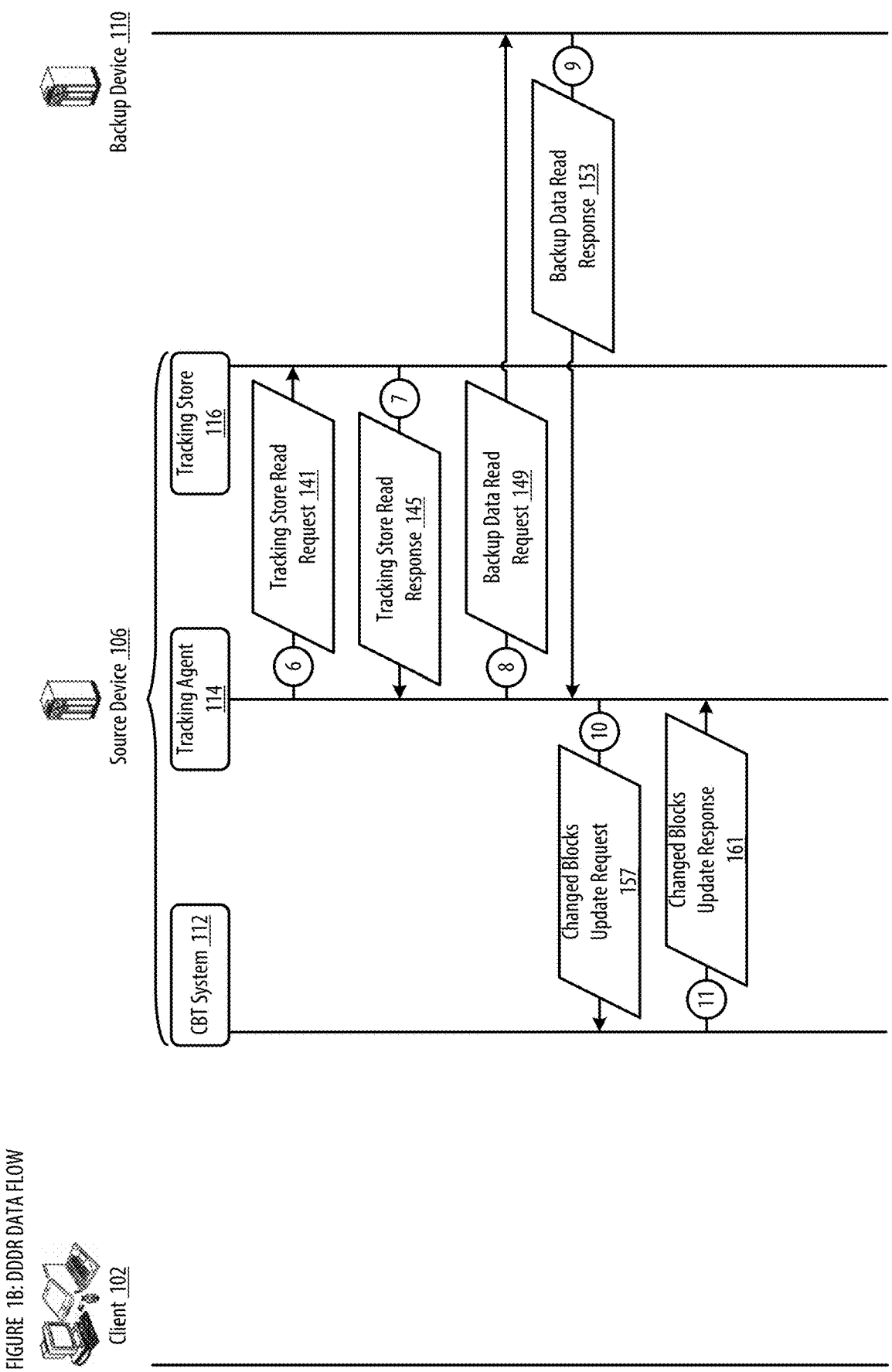

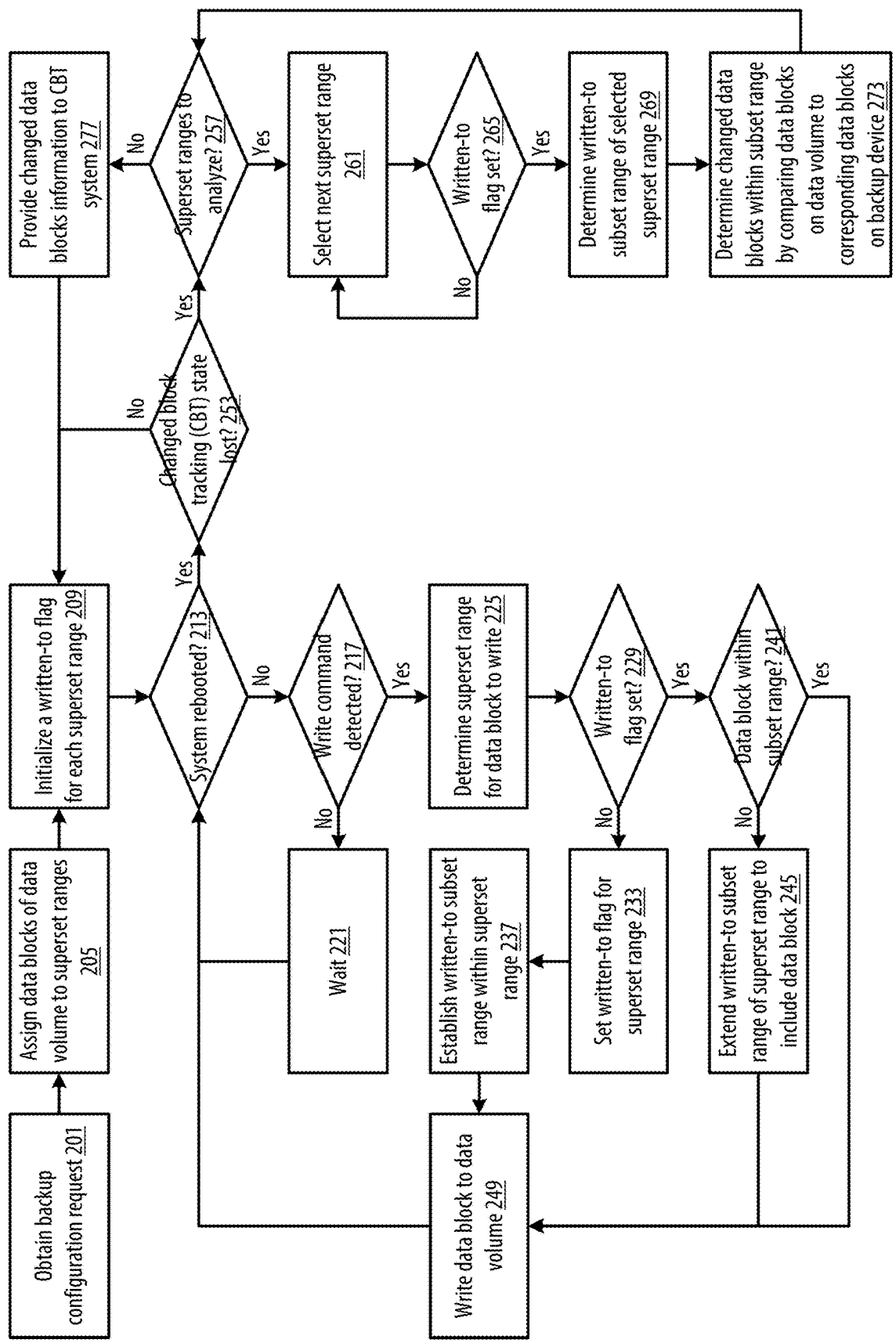
FIGURE 2: DDDR DDDRT COMPONENT

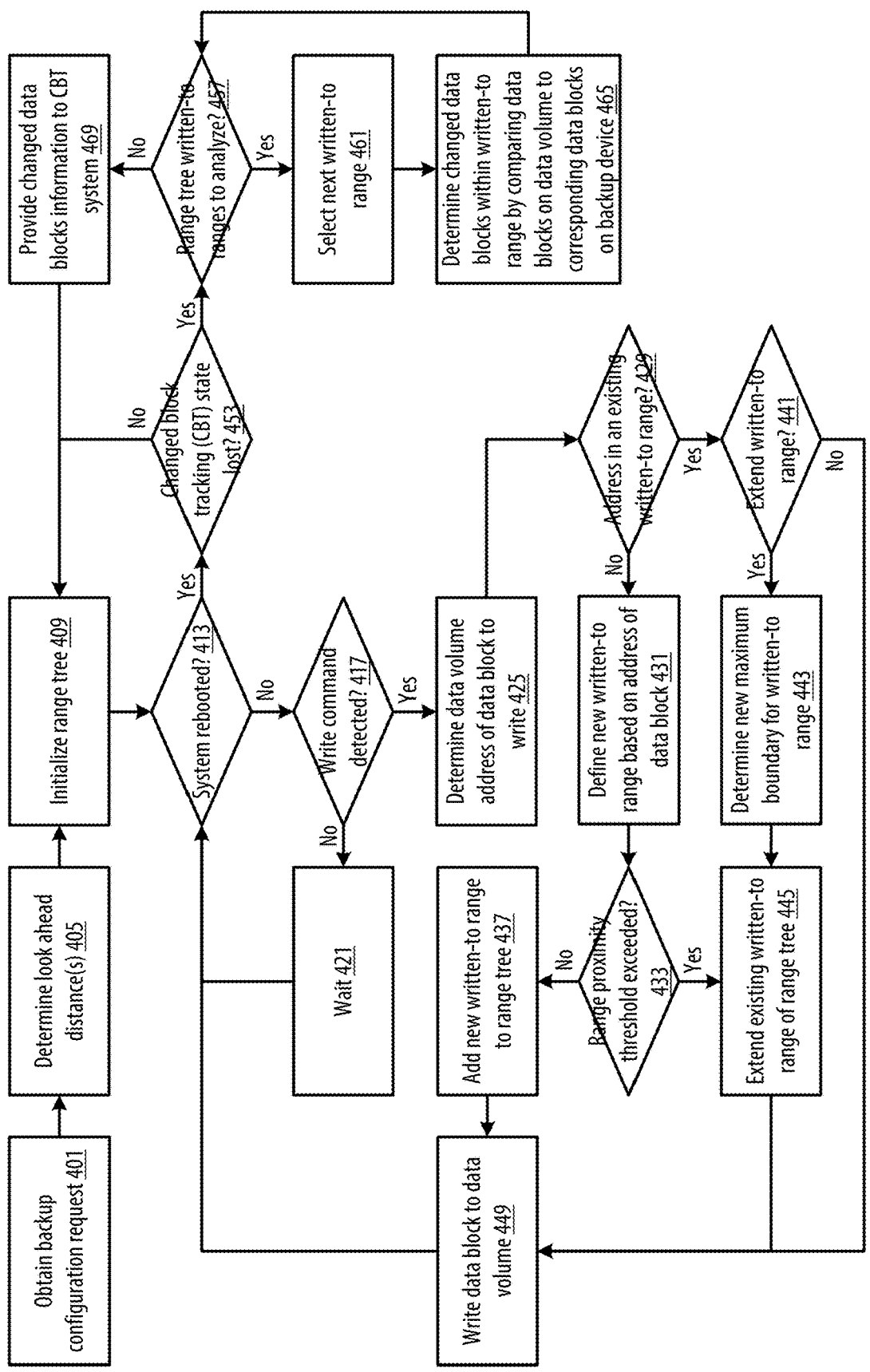

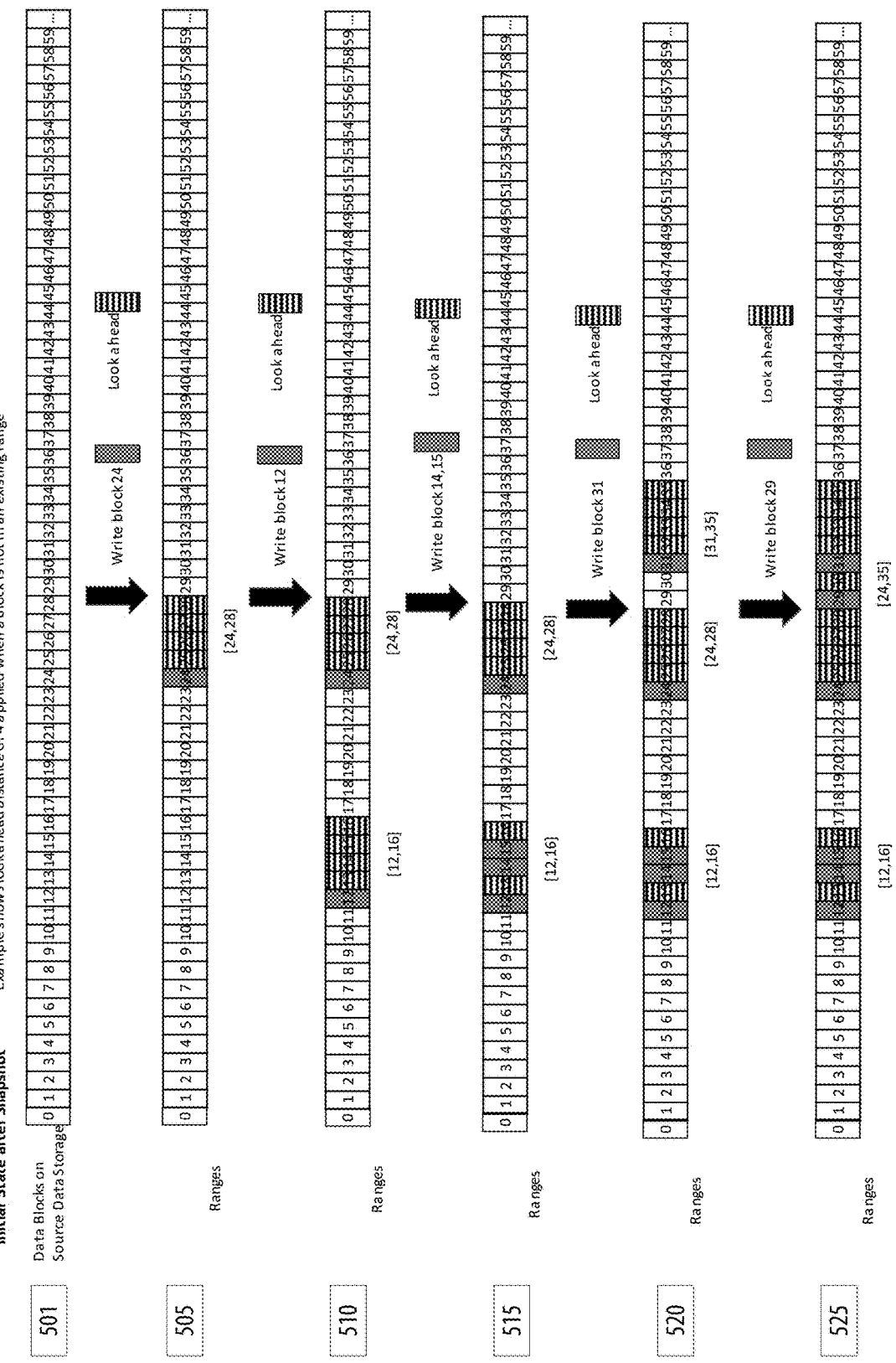

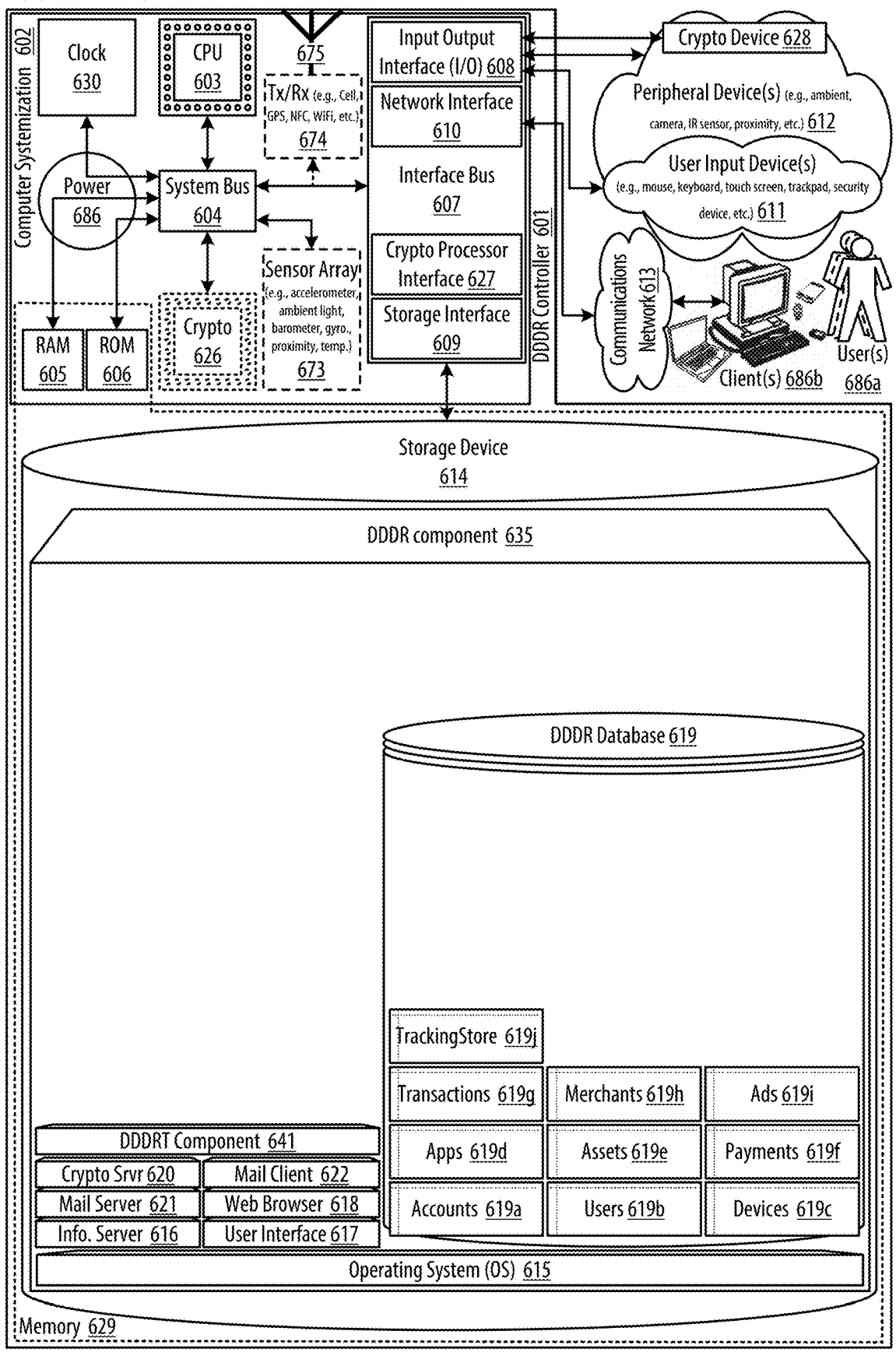
FIGURE 6: DDDR Controller

DYNAMICALLY DETERMINED DIFFERENCE REGIONS APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

Applications of interest include: U.S. patent application Ser. No. 16/285,189, filed Feb. 25, 2019, entitled "Object-Level Metadata-Preserving Cross Heterogeneous Operating Systems Backup And Restore Apparatuses, Methods And Systems"; U.S. patent application Ser. No. 16/424,469, filed May 28, 2019, entitled "Multiclient Backup Replication Apparatuses, Methods and Systems"; U.S. patent application Ser. No. 16/442,514, filed Jun. 16, 2019, entitled "User Space Incremental Tracking Apparatuses, Methods and Systems".

The entire contents of the aforementioned applications are herein expressly incorporated by reference.

FIELD

The present innovations generally address backup systems, and more particularly, include Dynamically Determined Difference Regions Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Computer system backups are utilized to protect data from being lost due to equipment failures, malware and accidental deletions. A backup may involve copying files to be backed up from one location to another location. For example, files may be copied from a solid-state drive in a user's desktop to an external hard drive that may be connected to the user's desktop via USB.

BRIEF DESCRIPTION OF THE DRAWINGS

Appendices and/or drawings illustrating various, non-limiting, example, innovative aspects of the Dynamically Determined Difference Regions Apparatuses, Methods and Systems (hereinafter "DDDR") disclosure, include:

FIGS. 1A-B show a datagraph illustrating data flow(s) for the DDDR;

FIG. 2 shows a logic flow illustrating embodiments of a Dynamically Determined Difference Regions Tracking (DDDRT) component for the DDDR;

FIG. 3 shows implementation case(s) for the DDDR;

FIG. 4 shows a logic flow illustrating embodiments of a Dynamically Determined Difference Regions Tracking (DDDRT) component for the DDDR;

FIG. 5 shows implementation case(s) for the DDDR;

FIG. 6 shows a block diagram illustrating embodiments of a DDDR controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Dynamically Determined Difference Regions Apparatuses, Methods and Systems (hereinafter "DDDR") transforms backup configuration request, backup data read response inputs, via DDDR components (e.g., DDDRT, etc. components), into backup configuration response, changed blocks update request outputs. The DDDR components, in various embodiments, implement advantageous features as set forth below.

INTRODUCTION

The DDDR provides unconventional features (e.g., efficiently recover tracking information utilized for incremental backups after an ungraceful shutdown, such as a power loss or a crash) that were never before available in backup systems. For example, a backup may involve copying a disk image or changes to a disk image of a client computing device to a storage device, such as a local data storage device, or to storage in the cloud. In another example, a backup may involve copying a disk image or changes to a disk image from cloud storage to cloud storage or from cloud storage to a local storage device.

A source computing system having a source data storage is backed up by a backup system having a backup data storage. A full image backup may be initially taken of the source data storage and may be stored in the backup data storage. Subsequent image backups of the source data storage may be incremental. The data blocks of the source data storage that were changed after the most recent backup and prior to a given incremental backup may be backed up. Data blocks that are changed between backups may be tracked using a Changed Block Tracking (CBT) system (e.g., a kernel-based system). The CBT system may be applied using volatile memory to avoid the performance degradation that would be caused by continually writing change block addresses to nonvolatile storage.

If the source system using the source data storage experiences an ungraceful shut down, such as loss of power or other crash, the changes tracked using the CBT system in volatile memory may be lost. A comparison (e.g., a differencing operation to identify the differences) may be performed between the backup storage and the source data storage to identify data blocks in the source data storage that have changed, so that they can be included in a subsequent incremental backup. The comparison may be data-block based between compact data identifiers, such as hash values or checksum values, for the data blocks. Rather than perform the comparison for all data blocks, which may be time-intensive and resource-intensive, the DDDR may perform the comparison over ranges known to contain changed blocks. In various embodiments, techniques to identify ranges over which to perform the data block comparison to identify changed data blocks for which the CBT system lost tracking information (e.g., due to an ungraceful shut down) and to update CBT system tracking information are illustrated.

DDDR

FIGS. 1A-B show a datagraph illustrating data flow(s) for the DDDR. In FIGS. 1A-B, a client 102 (e.g., of a user) may send a backup configuration request 121 to a source device 106 to facilitate installation of backup software on the source device (e.g., the backup software may include a CBT system 112 and/or a DDDRT component 129). For example, the client may be a desktop, a laptop, a tablet, a smartphone, a smartwatch, and/or the like that is executing a client application. It is to be understood that, in some implementations, the client and the source device may be the same device. In one implementation, the backup configuration request may include data such as a request identifier, a data volume identifier, a paired backup device identifier, a backup schedule, a look-ahead distance, and/or the like. In one embodiment, the client may provide the following example backup configuration request, substantially in the form of a (Secure) Hypertext Transfer Protocol ("HTTP(S)") POST message including eXtensible Markup Language ("XML") formatted data, as provided below:

```
POST/authrequest.php HTTP/1.1
Host: www.server.com
Content-Type: Application/XML
Content-Length: 667
<?XML version="1.0" encoding="UTF-8"?>
<auth_request>
  <timestamp>2020-12-31 23:59:59</timestamp>
  <user_accounts_details>
    <user_account_credentials>
      <user_name>JohnDaDoeDoeDoooe@gmail.com</user_name>
      <password>abc123</password>
      //OPTIONAL <cookie>cookieID</cookie>
      //OPTIONAL
        <digital_cert_link>www.mydigitalcertificate.com/JohnDoeDaDoeDoe@gmail.com/mycertifcate.dc</digital_cert_link>
      //OPTIONAL <digital_certificate>_DATA_</digital_certificate>
    </user_account_credentials>
  </user_accounts_details>
  <client_details>//iOS Client with App and Webkit
    //it should be noted that although several client details
    //sections are provided to show example variants of client
    //sources, further messages will include only on to save
    //space
    <client_IP>10.0.0.123</client_IP>
    <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>DDDR.app</app_name>
    <app_version>1.0</app_version>
    <app_webkit_name>Mobile Safari</client_webkit_name>
    <client_version>537.51.2</client_version>
  </client_details>
  <client_details>//iOS Client with Webbrowser
    <client_IP>10.0.0.123</client_IP>
    <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
  </client_details>
  <client_details>//Android Client with Webbrowser
    <client_IP>10.0.0.123</client_IP>
    <user_agent_string>Mozilla/5.0 (Linux; U; Android 4.0.4; en-us; Nexus S Build/IMM76D) AppleWebKit/534.30 (KHTML, like Gecko) Version/4.0 Mobile Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-XXXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
  </client_details>
  <client_details>//Mac Desktop with Webbrowser
    <client_IP>10.0.0.123</client_IP>
    <user_agent_string>Mozilla/5.0 (Macintosh; Intel Mac OS X 10_9_3) AppleWebKit/537.75.14 (KHTML, like Gecko) Version/7.0.3 Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-XXXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
```

```
<client_version>537.75.14</client_version>
</client_details>
<backup_configuration_request>
    <request_identifier>ID_request_1</request_identifier>
    <volume_identifier>ID_volume_1</volume_identifier>
    <backup_device_identifier>ID_backup_device_1</backup_device_identifier>
    <backup_schedule>create a snapshot 3 times per day</backup_schedule>
    <lookahead_distance>4 MB</lookahead_distance>
</backup_configuration_request>
</auth_request>
```

The source device may send a backup configuration response 125 to the client to inform the user that the backup software was installed successfully. In one implementation, the backup configuration response may include data such as a response identifier, a status, and/or the like. In one embodiment, the source device may provide the following example backup configuration response, substantially in the form of a HTTP(S) POST message including XML-formatted data, as provided below:

```
POST/backup_configuration_response.php HTTP/1.1
Host: www.server.com
Content-Type: Application/XML
Content-Length: 667
<?XML version="1.0" encoding="UTF-8"?>
<backup_configuration_response>
    <response_identifier>ID_response_1</response_identifier>
    <status>OK</status>
</backup_configuration_response>
```

The dynamically determined difference regions tracking (DDDRT) component 129 may utilize data provided in the backup configuration request to track changed data blocks and/or to identify ranges over which to perform data block comparisons to identify changed data blocks for which the CBT system lost tracking information and/or to update CBT system tracking information. See FIGS. 2 and 4 for additional details regarding the DDDRT component.

A tracking agent 114 on the source device may send a tracking store write request 133 to a tracking store 116 to update a written-to range associated with the volume to account for a newly changed data block (e.g., a sequence of data having a nominal length). In one embodiment, predefined superset ranges may be utilized for the tracking store. In one implementation, the tracking store write request may include data such as a request identifier, a volume identifier, a request type, a superset range identifier, a superset range changed flag, a subset range min, a subset range max, and/or the like. For example, the tracking agent may provide the following example tracking store write request, substantially in the form of a HTTP(S) POST message including XML-formatted data, as provided below:

```
POST/tracking_store_write_request.php HTTP/1.1
Host: www.server.com
Content-Type: Application/XML
Content-Length: 667
<?XML version="1.0" encoding="UTF-8"?>
<tracking_store_write_request>
    <request_identifier>ID_request_2</request_identifier>
    <volume_identifier>ID_volume_1</volume_identifier>
    <request_type>ESTABLISH_SUBSET_RANGE_WITHIN_SUPERSET_RANGE</request_type>
    <superset_range_identifier>ID_superset_1</superset_range_identifier>
    <superset_range_changed_flag>TRUE</superset_range_changed_flag>
    <subset_range_min>address of the newLy changed data bLock</subset_range_min>
    <subset_range_max>address of the newLy changed data bLock</subset_range_max>
</tracking_store_write_request>
```

In another embodiment, dynamically located ranges may be utilized for the tracking store. In one implementation, the tracking store write request may include data such as a request identifier, a volume identifier, a request type, a range list, a tree identifier, a range min, a range max, and/or the like. For example, the tracking agent may provide the following example tracking store write request, substantially in the form of a HTTP(S) POST message including XML-formatted data, as provided below:

```
POST/tracking_store_write_request.php HTTP/1.1
Host: www.server.com
Content-Type: Application/XML
Content-Length: 667
<?XML version="1.0" encoding="UTF-8"?>
<tracking_store_write_request>
    <request_identifier>ID_request_2</request_identifier>
    <volume_identifier>ID_volume_1</volume_identifier>
    <request_type>ADD_NEW_RANGE_TO_RANGE_TREE</request_type>
    <tree_identifier>ID_range_tree_1</tree_identifier>
    <range_min>address of the newLy changed data bLock</range_min>
    <range_max>address of the newLy changed data bLock+4 MB Look-aheadqrange_max>
</tracking_store_write_request>
```

The tracking store may send a tracking store write response 137 to the tracking agent to confirm that the write request was processed successfully. In one implementation, the tracking store write response may include data such as a response identifier, a status, and/or the like. In one embodiment, the tracking store may provide the following example tracking store write response, substantially in the form of a HTTP(S) POST message including XML-formatted data, as provided below:

```
POST/tracking_store_write_response.php HTTP/1.1
Host: www.server.com
Content-Type: Application/XML
Content-Length: 667
<?XML version="1.0" encoding="UTF-8"?>
<tracking_store_write_response>
    <response_identifier>ID_response_2</response_identifier>
    <status>OK</status>
</tracking_store_write_response>
```

After a reboot following an ungraceful shut down, such as loss of power or other crash, the tracking agent may send a tracking store read request 141 to the tracking store to determine written-to ranges that include changed data blocks for which the CBT system lost tracking information. In one implementation, the tracking store read request may include data such as a request identifier, a volume identifier, a request type, and/or the like. In one embodiment, the tracking agent may provide the following example tracking store read request, substantially in the form of a HTTP(S) POST message including XML-formatted data, as provided below:

```
POST/tracking_store_read_request.php HTTP/1.1
Host: www.server.com
Content-Type: Application/XML
Content-Length: 667
<?XML version="1.0" encoding="UTF-8"?>
```

```
<tracking_store_read_request>
    <request_identifier>ID_request_3</request_identifier>
    <volume_identifier>ID_volume_1</volume_identifier>
    <request_type>RETRIEVE_WRITTEN_TO_RANGES</request_type>
</tracking_store_read_request>
```

The tracking store may send a tracking store read response 145 to the tracking agent with the requested written-to ranges data. In one implementation, the tracking store read response may include data such as a response identifier, the requested written-to ranges data, and/or the like. In one embodiment, the tracking store may provide the following example tracking store read response, substantially in the form of a HTTP(S) POST message including XML-formatted data, as provided below:

```
POST/tracking_store_read_response.php HTTP/1.1
Host: www.server.com
Content-Type: Application/XML
Content-Length: 667
<?XML version="1.0" encoding="UTF-8"?>
<tracking_store_read_response>
    <response_identifier>ID_response_3</response_identifier>
    <written_to_ranges>
        <range>
            <range_identifier>ID_written_to_range_1</range_identifier>
            <range_min>written-to range 1 start address</range_min>
            <range_max>written-to range 1 end address</range_max>
        </range>
        <range>
            <range_identifier>ID_written_to_range_2</range_identifier>
            <range_min>written-to range 2 start address</range_min>
            <range_max>written-to range 2 end address</range_max>
        </range>
        . . .
    </written_to_ranges>
</tracking_store_read_response>
```

The tracking agent may send a backup data read request 149 to a backup device 110 to obtain compact data identifiers, such as hash values or checksum values, for data blocks in the determined written-to ranges. In one implementation, the backup data read request may include data such as a request identifier, a source device identifier, a volume identifier, a recovery point identifier (e.g., a snapshot identifier), a request type, written-to ranges data, and/or the like. In one embodiment, the tracking agent may provide the following example backup data read request, substantially in the form of a HTTP(S) POST message including XML-formatted data, as provided below:

```
POST/backup_data_read_request.php HTTP/1.1
Host: www.server.com
Content-Type: Application/XML
Content-Length: 667
<?XML version="1.0" encoding="UTF-8"?>
<backup_data_read_request>
    <request_identifier>ID_request_4</request_identifier>
    <source_device_identifier>ID source device 1</source_device_identifier>
    <volume_identifier>ID_volume_1</volume_identifier>
    <snapshot_identifier>Latest snapshot</snapshot_identifier>
    <request_type>OBTAIN_COMPACT_DATA_IDENTIFIERS</request_type>
    <written_to_ranges>
        <range>
            <range_identifier>ID_written_to_range_1</range_identifier>
            <range_min>written-to range 1 start address</range_min>
            <range_max>written-to range 1 end address</range_max>
        </range>
        <range>
            <range_identifier>ID_written_to_range_2</range_identifier>
            <range_min>written-to range 2 start address</range_min>
            <range_max>written-to range 2 end address</range_max>
        </range> . . .
    </written_to_ranges>
</backup_data_read_request>
```

The backup device may send a backup data read response 153 to the tracking agent with the requested compact data identifiers data. In one implementation, the backup data read response may include data such as a response identifier, the requested compact data identifiers data, and/or the like. In one embodiment, the backup device may provide the following example backup data read response, substantially in the form of a HTTP(S) POST message including XML-formatted data, as provided below:

```
POST/backup_data_read_response.php HTTP/1.1
Host: www.server.com
Content-Type: Application/XML
Content-Length: 667
<?XML version="1.0" encoding="UTF-8"?>
<backup_data_read_response>
    <response_identifier>ID_response_4</response_identifier>
    <compact_data_identifiers>
        <data_block>
            <data_block_identifier>ID_data_block_1</data_block_identifier>
            <data_block_hash>hash of data bLock 1</data_block_hash>
        </data_block>
        <data_block>
            <data_block_identifier>ID_data_block_2</data_block_identifier>
            <data_block_hash>hash of data bLock 2</data_block_hash>
        </data_block>
        . . .
    </compact_data_identifiers>
</backup_data_read_response>
```

The tracking agent may send a changed blocks update request 157 to the CBT system 112 to facilitate updating CBT system tracking information. In one implementation, the changed blocks update request may include data such as a request identifier, a volume identifier, a request type, changed data blocks data, and/or the like. In one embodiment, the tracking agent may provide the following example changed blocks update request, substantially in the form of a HTTP(S) POST message including XML-formatted data, as provided below:

```
POST/changed_blocks_update_request.php HTTP/1.1
Host: www.server.com
Content-Type: Application/XML
```

Content-Length: 667
<?XML version="1.0" encoding="UTF-8"?>
<changed_blocks_update_request>
<request_identifier>ID_request_5</request_identifier>
<volume_identifier>ID_volume_1</volume_identifier>
<request_type>UPDATE_CHANGED_DATA_
 BLOCKS</request_type>
<changed_data_blocks>ID data block_1, ID_data_
 block_5, . . . </changed_data_blocks>
</changed_blocks_update_request>

The CBT system may send a changed blocks update response 161 to the tracking agent to confirm that the changed blocks update request was processed successfully. In one implementation, the changed blocks update response may include data such as a response identifier, a status, and/or the like. In one embodiment, the CBT system may provide the following example changed blocks update response, substantially in the form of a HTTP(S) POST message including XML-formatted data, as provided below:
 POST/changed_blocks_update_response.php HTTP/1.1
 Host: www.server.com
 Content-Type: Application/XML
 Content-Length: 667
 <?XML version="1.0" encoding="UTF-8"?>
 <changed_blocks_update_response>
 <response_identifier>ID_response_5</response_identifier>
 <status>OK</status>
 </changed_blocks_update_response>

FIG. 2 shows a logic flow illustrating embodiments of a Dynamically Determined Difference Regions Tracking (DDDRT) component for the DDDR. In FIG. 2, a backup configuration request may be obtained at 201. For example, the backup configuration request may be obtained as a result of installation of backup software on a source device to facilitate updating changed block tracking (CBT) system tracking information for a data volume when the CBT system loses state information (e.g., after an ungraceful shut down).

Data blocks of the data volume may be assigned to superset ranges at 205. For example, this assignment may define superset ranges from which the DDDRT component may identify subset ranges that contain written-to data blocks. In one embodiment, this assignment may be performed by creating a logical range index table (e.g., in volatile memory and nonvolatile memory) that contains information sufficient to indicate the extent of each superset range (e.g., based on a specified superset length (e.g., 10 data blocks, 50 MB)). In one implementation, the logical range index table may utilize a start index and an end index for each superset range to define the start $S(z)$ and end $E(z)$ data block addresses of each logical range i. In another implementation, the logical range index table may utilize a start index for each superset range to define the start $S(z)$ data block address of each logical range i. For example, this implementation may be utilized when data block addresses of each superset range are contiguous, range to range, to eliminate redundancy (e.g., since $E(z)$ may be the data block preceding $S(i+1)$ (e.g., with the exception of the last superset range)).

A written-to flag for each superset range may be initialized at 209. In one embodiment, a written-to flag may indicate whether any data blocks have been written to the corresponding superset range since time $t_1$ (e.g., since the last successful shutdown, since the last time a snapshot of the data volume was taken and sent to a backup device). In one implementation, the written-to flags may be initialized (e.g., in volatile memory and nonvolatile memory) prior to any data writes to the data volume (e.g., since time $t_1$). For example, the written-to flag for range i may be initialized via a command similar to the following:
 written_to(i)=0

A determination may be made at 213 whether the operating system was rebooted. If the operating system was not rebooted, a determination may be made at 217 whether a write command to the data volume is detected. If a write command is not detected, the DDDRT component may wait at 221. In one implementation, the DDDRT component may wait until it is notified that a write command was detected. In another implementation, the DDDRT component may wait a specified amount of time (e.g., 5 minutes).

If a write command is detected, a superset range for a data block to write may be determined at 225. In one implementation, the address block_add of the data block to write may be used to determine a superset range writing_to_range as follows:
 writing to_range=i, such that $S(i) \leq bLock\_add \leq E(i)$ A determination may be made at 229 whether the written-to flag corresponding to the determined superset range is set. If the determined superset range was not previously written to and the written-to flag is not set, the written-to flag for the determined superset range may be set (e.g., in volatile memory and nonvolatile memory) at 233. For example, the written-to flag for the determined superset range writing_to_range may be set via a command similar to the following:
 written_to(writing_to_range)=1

A written-to subset range within the superset range may be established (e.g., in volatile memory and nonvolatile memory) at 237. For example, a written-to subset range may be defined by max and min addresses. In one embodiment, a written-to subset range may indicate a portion of a superset range where at least some of the data blocks have been written to. In one implementation, the written-to subset range within the superset range may be established based on the address block_add of the data block to write. For example, the written-to subset range within the superset range may be established via a command similar to the following:
 min_written(writing_to_range)=bLock_add
 max_written(writing_to_range)=bLock_add In another implementation, the written-to subset range within the superset range may be established based on the address block add of the data block to write and a look-head distance (e.g., 4 MB, 8 MB, 16 MB, which are non-limiting examples and may be chosen based on a number of factors, such as statistical patterns of use, volume size, volume access technology, and/or the like). For example, the written-to subset range within the superset range may be established via a command similar to the following:
 min_written(writing_to_range)=bLock_add
 max_written(writing_to_range)=bLock_add+Look-ahead In some cases, using a look-head distance may extend max_written(writing_to_range) beyond $E(writing\_to\_range)$. If this occurs, the DDDRT component may be configured to either (a) stop max_written(writing_to_range) at end of current range $E(writing\_to\_range)$, or (b) extend max_written(writing_to_range) into the next range:
 (a) Let max_written(writing_to_range)=E(writing_to_range)
 OR
 (b) Let max_written(writing_to_range)=E(writing_to_range)

And write the remaining distance into the next range
written_to(writing_to_range+1)=1
min_written(writing_to_range+1)=S(writing_to_range+1)
max_written(writing_to_range+1)=bLock_add+Look-ahead The data block to write may be written to the data volume at 249. In one implementation, a preoperation callback routine of a filter driver may be utilized for DDDRT component processing after the write command is detected, and a file system driver may be utilized to write the data block to the data volume.

If the determined superset range was previously written to and the written-to flag is set, a determination may be made at 241 whether the data block to write is within the previously established written-to subset range corresponding to the determined superset range. If the data block to write is not within the written-to subset range, the written-to subset range of the determined superset range may be extended (e.g., in volatile memory and nonvolatile memory) to include the data block to write at 245. In one implementation, the written-to subset range within the superset range writing_to_range may be extended based on the address block_add of the data block to write. For example, the written-to subset range within the superset range may be extended via a command similar to the following:

if (bLock_add <min_written(writing_to_range)) then
min_written(writing_to_range)=bLock_add
else if (bLock_add >max_written(writing_to_range)) then
max_written(writing_to_range)=bLock_add In an alternative embodiment, if the sum of the address block_add of the data block to write and of a look-ahead distance (e.g., this can be the same as the look-ahead distance discussed with regard to 237 or a different look-ahead distance) is greater than the maximum boundary of the written-to subset range, the maximum boundary of the written-to subset range may be extended (e.g., without exceeding the end E(writing_to_range) data block address of the superset range) to account for the look-ahead distance. For example, the written-to subset range within the superset range may be extended via a command similar to the following:

max_written(writing_to_range)=bLock_add+Look-ahead

Alternatively, the written-to subset range within the superset range may be extended in a similar way as discussed with regard to 237 for cases where using a look-head distance may extend max_written(writing_to_range) beyond E(writing_to_range).

The data block to write may be written to the data volume at 249. In one implementation, a preoperation callback routine of a filter driver may be utilized for DDDRT component processing after the write command is detected, and a file system driver may be utilized to write the data block to the data volume.

If the operating system was rebooted, a determination may be made at 253 whether CBT system state was lost. For example, if the source device experienced an ungraceful shut down, such as loss of power or other crash, the changes tracked using the CBT system in volatile memory may be lost. If it is determined that the source device experienced an ungraceful shut down and CBT system state was lost, a determination may be made at 257 whether there remain superset ranges to analyze. In one embodiment, the superset ranges may be analyzed to identify ranges over which to perform data block comparisons to identify changed data blocks for which the CBT system lost tracking information.

In one implementation, each of the superset ranges may be analyzed. If there remain superset ranges to analyze, the next superset range may be selected at 261.

A determination may be made at 265 whether the written-to flag corresponding to the selected superset range i is set. If the written-to flag is set (e.g., written_to(i)=1), the written-to subset range of the selected superset range may be determined at 269. In one implementation, the min (e.g., min_written(z)) and max (e.g., max_written(z)) values of the written-to subset range (e.g., stored in nonvolatile memory) may be determined.

Changed data blocks within the determined written-to subset range may be determined by comparing applicable data blocks on the data volume to the corresponding data blocks on the backup device at 273. In one implementation, compact data identifiers, such as hash values (e.g., calculated using a hash function such as MD5, SHA-1, and/or the like) or checksum values, for data blocks in the determined written-to subset range on the data volume may be compared to compact data identifiers of the corresponding data blocks on the backup device. If the two compact data identifiers for a data block match, the data block did not change. If the two compact data identifiers for the data block are different, the data block changed and may be added to a set (e.g., a list) of changed data blocks.

If there do not remain superset ranges to analyze, changed data blocks information may be provided to the CBT system at 277. In one implementation, the set of changed data blocks may be provided to the CBT system (e.g., for inclusion in a subsequent incremental backup). For example, the set of changed data blocks may be provided via a changed blocks update request.

FIG. 3 shows implementation case(s) for the DDDR. In FIG. 3, an exemplary embodiment of utilizing the DDDRT component using predefined superset ranges to identify written-to subset ranges is illustrated. Initial state (e.g., since the last successful shutdown, since the last time a snapshot of a data volume was taken and sent to a backup device) is shown at 301. A written-to flag for each superset range is initialized to 0, and written-to subset ranges are empty.

After several writes, denoted by solid blocks, updated written-to flags and written-to subset ranges are shown at 305. For example, when data blocks 4, 5, 6 are written to, the written-to flag of the corresponding superset range is set to 1 and the corresponding written-to subset range is defined as [4,6]. In another example, when data blocks 51, 57, 58 are written to, the written-to flag of the corresponding superset range is set to 1 and the corresponding written-to subset range is defined as [51,58].

After several more writes, denoted by striped blocks, updated written-to flags and written-to subset ranges are shown at 310. For example, when data blocks 6, 8, 9 are written to, the corresponding written-to subset range is extended to [4,9]. In another example, when data blocks 52, 53 are written to, the corresponding written-to subset range is unchanged.

FIG. 4 shows a logic flow illustrating embodiments of a Dynamically Determined Difference Regions Tracking (DDDRT) component for the DDDR. In FIG. 4, a backup configuration request may be obtained at 401. For example, the backup configuration request may be obtained as a result of installation of backup software on a source device to facilitate updating changed block tracking (CBT) system tracking information for a data volume when the CBT system loses state information (e.g., after an ungraceful shut down).

One or more look-ahead distances may be determined at 405. In one embodiment, a look-ahead distance may be determined for defining a new written-to range. In another embodiment, a look-ahead distance may be determined for extending an existing written-to range. It is to be understood that a single look-ahead distance may be used for both cases. In one implementation, the backup configuration request may be parsed (e.g., using PHP commands) to determine the one or more look-ahead distances (e.g., based on the value of the lookahead_distance field).

A list of dynamically located ranges, such as a range tree R, may be initialized at 409. It is to be understood that another tree data structure, such as a segment tree, an interval tree, and/or the like may be utilized instead. In one embodiment, utilizing a tree of dynamically located ranges facilitates setting max and min addresses of written-to ranges to any location determined by the addresses of blocks being written and a look-ahead block distance. In one implementation, an empty range tree may be created (e.g., in volatile memory and nonvolatile memory).

A determination may be made at 413 whether the operating system was rebooted. If the operating system was not rebooted, a determination may be made at 417 whether a write command to the data volume is detected. If a write command is not detected, the DDDRT component may wait at 421. In one implementation, the DDDRT component may wait until it is notified that a write command was detected. In another implementation, the DDDRT component may wait a specified amount of time (e.g., 5 minutes).

A data volume address of a data block to write may be determined at 425. In one implementation, the address block_add of the data block to write may be determined by parsing the detected write command A determination may be made at 429 whether the address block_add of the data block to write is in an existing written-to range of the range tree (e.g., by querying the range tree R). If the address block_add of the data block to write is not in an existing written-to range, a new written-to range i may be defined (e.g., in volatile memory and nonvolatile memory) based on the address block_add of the data block to write in the range tree at 431. For example, a written-to range may be defined by max and min addresses. In one embodiment, a written-to range may indicate a portion of the data volume where at least some of the data blocks have been written to. In one implementation, the new written-to range i may be defined based on the address block_add of the data block to write and a look-head distance (e.g., 4 MB, 8 MB, 16 MB, which are non-limiting examples and may be chosen based on a number of factors, such as statistical patterns of use, volume size, volume access technology, and/or the like). For example, the new written-to range i may be defined via a command similar to the following:

min_range(i)=bLock_add
max_range(i)=bLock_add+Look-ahead

In some alternative embodiments, instead of using a fixed look-ahead size, the look-ahead distance may be determined dynamically using file information. If a data block being written to is currently unallocated, the size of the file being written may be determined (e.g., using a minifilter driver) and the look-ahead distance may be defined to include the entire size of the file that the file system is expected to write. For example, a list of currently unallocated data blocks may be maintained to facilitate this determination. If a data block is written to an allocated part of the data volume, the file associated with the data block may be determined and the look-ahead distance may be defined to include the entire file on the data volume. Alternatively, a list of data blocks associated with the file on the data volume may be determined and used to update the range tree (e.g., in cases where the file is fragmented across various parts of the data volume). For example, list of blocks caching may be utilized to make this determination (e.g., to avoid the wait time associated with reads to gather a list of blocks for a file).

A determination may be made at 433 whether range proximity threshold for the new written-to range is exceeded. In one implementation, if the new written-to range overlaps with, or is adjacent to, or is within a threshold distance of an existing neighboring written-to range j in the range tree, the range proximity threshold is exceeded.

If the range proximity threshold is not exceeded, the new written-to range i may be added to the range tree R (e.g., in volatile memory and nonvolatile memory) at 437. For example, the new written-to range i may be added to the range tree R via a command similar to the following:

add_range(R, min_range(i), max_range(i))

If the range proximity threshold is exceeded, the neighboring written-to range j may be extended (e.g., in volatile memory and nonvolatile memory) to include the new written-to range i at 445. For example, the neighboring written-to range j may be extended via a command similar to the following:

new min_range(j)=min_range(j)
new max(j)=max_range(j)
if (min_range(i)<min_range(j)) then
new min_range(j)=min_range(i)
if (max_range(i) >max_range(j)) then
new max_range(j)=max_range(i)
update_range(R, j, new min_range(j), new max_range(j))

The data block to write may be written to the data volume at 449. In one implementation, a preoperation callback routine of a filter driver may be utilized for DDDRT component processing after the write command is detected, and a file system driver may be utilized to write the data block to the data volume.

If the address block_add of the data block to write is in an existing written-to range k, a determination may be made at 441 whether to extend the existing written-to range k. In one implementation, if the address block_add of the data block to write is in the existing written-to range k, the existing written-to range k is not extended. In another implementation, if the sum of the address block_add of the data block to write and of a look-ahead distance (e.g., this can be the same as the look-ahead distance discussed with regard to 431 or a different look-ahead distance) is greater than the maximum boundary of the existing written-to range k, the maximum boundary of the existing written-to range k may be extended to account for the look-ahead distance.

If the existing written-to range k should be extended, a new maximum boundary for the existing written-to range k may be determined at 443. For example, the new maximum boundary for the existing written-to range k may be determined via a command similar to the following:

if (bLock_add+4 MB look-ahead >max_range(k)) then
new max_range(k)=bLock_add+4 MB look-ahead The existing written-to range k of the range tree R may be extended (e.g., in volatile memory and nonvolatile memory) to account for the new maximum boundary at 445. For example, the existing written-to range k may be extended via a command similar to the following:

update_range(R, k, min_range(k), new max_range(k))

The data block to write may be written to the data volume at 449. In one implementation, a preoperation callback routine of a filter driver may be utilized for DDDRT component processing after the write command is detected, and a file system driver may be utilized to write the data block to the data volume.

If the operating system was rebooted, a determination may be made at 453 whether CBT system state was lost. For example, if the source device experienced an ungraceful shut down, such as loss of power or other crash, the changes tracked using the CBT system in volatile memory may be lost. If it is determined that the source device experienced an ungraceful shut down and CBT system state was lost, a determination may be made at 457 whether there remain written-to ranges to analyze. In one implementation, each of the written-to ranges in the range tree may be analyzed. If there remain written-to ranges to analyze, the next written-to range may be selected at 461.

Changed data blocks within the selected written-to range may be determined by comparing applicable data blocks on the data volume to the corresponding data blocks on the backup device at 465. In one implementation, compact data identifiers, such as hash values (e.g., calculated using a hash function such as MD5, SHA-1, and/or the like) or checksum values, for data blocks in the selected written-to range on the data volume may be compared to compact data identifiers of the corresponding data blocks on the backup device. If the two compact data identifiers for a data block match, the data block did not change. If the two compact data identifiers for the data block are different, the data block changed and may be added to a set (e.g., a list) of changed data blocks.

If there do not remain written-to ranges to analyze, changed data blocks information may be provided to the CBT system at 469. In one implementation, the set of changed data blocks may be provided to the CBT system (e.g., for inclusion in a subsequent incremental backup). For example, the set of changed data blocks may be provided via a changed blocks update request.

FIG. 5 shows implementation case(s) for the DDDR. In FIG. 5, an exemplary embodiment of utilizing the DDDRT component using dynamically located ranges to identify written-to ranges is illustrated. Initial state (e.g., since the last successful shutdown, since the last time a snapshot of a data volume was taken and sent to a backup device) is shown at 501. An empty range tree is initialized, and a look-ahead distance of 4 data blocks is utilized when a data block to write is not in an existing written-to range of the range tree. Data blocks to write are denoted by solid blocks, and look-ahead data blocks are denoted by striped blocks.

As shown at 505, when a command to write to data block 24 is detected, a first written-to range [24,28] is added to the range tree. As shown at 510, when a command to write to data block 12 is detected, a second written-to range [12,16] is added to the range tree. As shown at 515, when commands to write to data blocks 14, 15 are detected, the second written-to range [12,16] is unmodified. As shown at 520, when a command to write to data block 31 is detected, a third written-to range [31,35] is added to the range tree. As shown at 525, when a command to write to data block 29 is detected, a range proximity threshold is exceeded, and the first written-to range [24,28] is extended and merged with the third written-to range [31,35], and the first written-to range becomes [24,35].

DDDR Controller

FIG. 6 shows a block diagram illustrating embodiments of a DDDR controller. In this embodiment, the DDDR controller 601 may serve to aggregate, process, store, search, serve, identify, instruct, generate, match, and/or facilitate interactions with a computer through backup systems technologies, and/or other related data.

Users, which may be people and/or other systems, may engage information technology systems (e.g., computers) to facilitate information processing. In turn, computers employ processors to process information; such processors 603 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DDDR controller 601 may be connected to and/or communicate with entities such as, but not limited to: one or more users from peripheral devices 612 (e.g., user input devices 611); an optional cryptographic processor device 628; and/or a communications network 613.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WAN s), Wireless Networks (WLANs), etc. For example, the Internet is, generally, an interconnection of a multitude of networks whereby remote clients and servers may access and interoperate with one another.

The DDDR controller 601 may be based on computer systems that may comprise, but are not limited to, components such as: a computer systemization 602 connected to memory 629.

Computer Systemization

A computer systemization 602 may comprise a clock 630, central processing unit ("CPU(s)" and/or "processor(s)" (these terms are used interchangeable throughout the disclosure unless noted to the contrary)) 603, a memory 629 (e.g., a read only memory (ROM) 606, a random access memory (RAM) 605, etc.), and/or an interface bus 607, and most frequently, although not necessarily, are all interconnected and/or communicating through a system bus 604 on one or more (mother)board(s) 602 having conductive and/or otherwise transportive circuit pathways through which instructions (e.g., binary encoded signals) may travel to effectuate communications, operations, storage, etc. The computer systemization may be connected to a power source 686; e.g., optionally the power source may be internal. Optionally, a cryptographic processor 626 may be connected to the system bus. In another embodiment, the cryptographic processor, transceivers (e.g., ICs) 674, and/or sensor array (e.g., accelerometer, altimeter, ambient light, barometer, global positioning system (GPS) (thereby allowing DDDR controller to determine its location), gyroscope, magnetometer, pedometer, proximity, ultra-violet sensor, etc.) 673 may be connected as either internal and/or external peripheral devices 612 via the interface bus I/O 608 (not pictured) and/or directly via the interface bus 607. In turn, the transceivers may be connected to antenna(s) 675, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11 g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the DDDR controller and beyond through various interfaces. Should processing requirements dictate a greater amount speed and/or capacity, distributed processors (e.g., see Distributed DDDR below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the DDDR may be achieved by implementing a microcontroller such as CAST's® R8051XC2 microcontroller; Intel's® MCS 51 (i.e., 8051 microcontroller); and/or the like. Also, to implement certain features of the DDDR, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DDDR component collection (distributed or otherwise) and/or features may be implemented via the microprocessor and/or via embedded components; e.g., via ASIC, coprocessor, DSP, FPGA, and/or the like. Alternately, some implementations of the DDDR may be implemented with embedded components that are configured and used to achieve a variety of features or signal processing.

Depending on the particular implementation, the embedded components may include software solutions, hardware solutions, and/or some combination of both hardware/software solutions. For example, DDDR features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the DDDR features. A hierarchy of programmable interconnects allow logic blocks to be interconnected as needed by the DDDR system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DDDR may be developed on FPGAs and then migrated into a fixed version that more resembles ASIC implementations. Alternate or coordinating implementations may migrate DDDR controller features to a final ASIC instead of or in addition to FPGAs. Depending on the implementation all of the aforementioned embedded components and microprocessors may be considered the "CPU" and/or "processor" for the DDDR.

Power Source

The power source 686 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the DDDR thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(ses) 607 may accept, connect, and/or communicate to a number of interface adapters, variously although not necessarily in the form of adapter cards, such as but not limited to: input output interfaces (I/O) 608, storage interfaces 609, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 609 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Through a communications network 613, the DDDR controller is accessible through remote clients 633b (e.g., computers with web browsers) by users 633a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed DDDR below), architectures may similarly be employed to pool, load balance, and/or otherwise decrease/increase the communicative bandwidth required by the DDDR controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 608 may accept, communicate, and/or connect to user, peripheral devices 612 (e.g., input devices 611), cryptographic processor devices 628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 612 may be connected and/or communicate to I/O and/or other facilities of the like such as network interfaces, storage interfaces, directly to the interface bus, system bus, the CPU, and/or the like. Peripheral devices may be external, internal and/or part of the DDDR controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 611 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the DDDR controller may be embodied as an embedded, dedicated, and/or monitor-less (i.e., headless) device, wherein access would be provided over a network interface connection.

Cryptographic units such as, but not limited to, microcontrollers, processors 626, interfaces 627, and/or devices 628 may be attached, and/or communicate with the DDDR controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 629. However, memory is a fungible technology and resource, thus, any number of memory embodiments may be employed in lieu of or in concert with one another. It is to be understood that the DDDR controller and/or a computer systemization may employ various forms of memory 629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 629 will include ROM 606, RAM 605, and a storage device 614. A storage device 614 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 629 may contain a collection of program and/or database components and/or data such as, but not limited to: operating system component(s) 615 (operating system); information server component(s) 616 (information server); user interface component(s) 617 (user interface); Web browser component(s) 618 (Web browser); database(s) 619; mail server component(s) 621; mail client component(s) 622; cryptographic server component(s) 620 (cryptographic server); the DDDR component(s) 635; and/or the like (i.e., collectively a component collection). These components may be stored and accessed from the storage devices and/or from storage devices accessible through an interface bus. Although unconventional program components such as those in the component collection may be stored in a local storage device 614, they may also be loaded and/or stored in memory such as: peripheral devices, RAM, remote storage facilities through a communications network, ROM, various forms of memory, and/or the like.

Operating System

The operating system component 615 is an executable program component facilitating the operation of the DDDR controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®;

Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DDDR controller to communicate with other entities through a communications network 613. Various communication protocols may be used by the DDDR controller as a subcarrier transport mechanism for interaction, such as, but not limited to: multicast, TCP/IP, UDP, unicast, and/or the like.

Information Server

An information server component 616 is a stored program component that is executed by a CPU. The information server may be a an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DDDR controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DDDR database 619, operating systems, other program components, user interfaces, Web browsers, and/or the like.

Access to the DDDR database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DDDR. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the DDDR as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 617 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 618 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DDDR enabled nodes. The combined application may be nugatory on systems employing Web browsers.

Mail Server

A mail server component 621 is a stored program component that is executed by a CPU 603. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the DDDR. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the DDDR mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 622 is a stored program component that is executed by a CPU 603. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POPS, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 620 is a stored program component that is executed by a CPU 603, cryptographic processor 626, cryptographic processor interface 627, cryptographic processor device 628, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the DDDR may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to allow the DDDR component to engage in secure transactions if so desired. The cryptographic component facilitates the secure accessing of resources on the DDDR and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DDDR Database

The DDDR database component 619 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the DDDR database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DDDR database is implemented as a data-structure, the use of the DDDR database 619 may be integrated into another component such as the DDDR component 635. Also, the database may be implemented as a mix of data structures, objects, and relational structures. Databases may be consolidated and/or distributed in countless variations (e.g., see Distributed DDDR below). Portions of databases, e.g., tables, may be exported and/or imported and thus decentralized and/or integrated.

In one embodiment, the database component 619 includes several tables 619*a-j*:

An accounts table 619*a* includes fields such as, but not limited to: an accountID, accountOwnerID, accountContactID, assedIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 619*b* includes fields such as, but not limited to: a userID, userSSN, taxID, userContactID, accountID, assedIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a DDDR);

An devices table 619*c* includes fields such as, but not limited to: deviceID, sensorIDs, accountID, as setIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceVersion, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 619d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, app Restrictions, portNum, access_API_call, linked_wallets_list, and/or the like;

An assets table 619e includes fields such as, but not limited to: assetID, accountID, userID, distributorAccountID, distributorPaymentID, distributorOnwerID, as setOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, sub scriptionIDs, assetAuthroizationCode, assetAccessPrivileges, assetPreferences, assetRestrictions, assetAPI, assetAPIconnectionAddress, and/or the like;

A payments table 619f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 619g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 619h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 619i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A tracking store table 619j includes fields such as, but not limited to: dataVolumeID, dataVolumeSupersetRangeID, dataVolumeSupersetRangeStart, dataVolumeSupersetRangeEnd, dataVolumeSupersetRangeChangedFlag, dataVolumeSubsetRangeID, dataVolumeSubsetRangeStart, dataVolumeSubsetRangeEnd, dataVolumeRangeTreeID, rangeTreeNodeID, rangeTreeNodeRangeStart, rangeTreeNodeRangeEnd, rangeTreeNodeParentNodeID, rangeTreeNodeLeftChildNodeID, rangeTreeNodeRightChildNodeID, and/or the like.

In one embodiment, the DDDR database may interact with other database systems. For example, employing a distributed database system, queries and data access by search DDDR component may treat the combination of the DDDR database, an integrated data security layer database as a single database entity (e.g., see Distributed DDDR below).

In one embodiment, user programs may contain various user interface primitives, which may serve to update the DDDR. Also, various accounts may require custom database tables depending upon the environments and the types of clients the DDDR may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 619a-j. The DDDR may be configured to keep track of various settings, inputs, and parameters via database controllers.

The DDDR database may communicate to and/or with other components in a component collection, including itself, and/or facilities of the like. Most frequently, the DDDR database communicates with the DDDR component, other program components, and/or the like. The database may contain, retain, and provide information regarding other nodes and data.

The DDDRs

The DDDR component 635 is a stored program component that is executed by a CPU. In one embodiment, the DDDR component incorporates any and/or all combinations of the aspects of the DDDR that was discussed in the previous figures. As such, the DDDR affects accessing, obtaining and the provision of information, services, transactions, and/or the like across various communications networks. The features and embodiments of the DDDR discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the DDDR's features and facilities, and in many cases reduce the costs, energy consumption/requirements, and extend the life of DDDR's underlying infrastructure; this has the added benefit of making the DDDR more reliable. Similarly, many of the features and mechanisms are designed to be easier for users to use and access, thereby broadening the audience that may enjoy/employ and exploit the feature sets of the DDDR; such ease of use also helps to increase the reliability of the DDDR. In addition, the feature sets include heightened security as noted via the Cryptographic components 620, 626, 628 and throughout, making access to the features and data more reliable and secure The DDDR transforms backup configuration request, backup data read response inputs, via DDDR components (e.g., DDDRT), into backup configuration response, changed blocks update request outputs.

The DDDR component enabling access of information between nodes may be developed by employing various development tools and languages such as, but not limited to: Apache® components, Assembly, ActiveX, binary executables, (ANSI) (Objective−) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the DDDR server employs a cryptographic server to encrypt and decrypt communications. The DDDR component may communicate to and/or with other components in a component collection, including itself, and/or facilities of the like. Most frequently, the DDDR component communicates with the DDDR database, operating systems, other program components, and/or the like. The DDDR may contain, communicate, generate, obtain, and/or provide program component, system, user, and/or data communications, requests, and/or responses.

Distributed DDDRs

The structure and/or operation of any of the DDDR node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the DDDR controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for DDDR controller and/or DDDR component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DDDR controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message do {
    $input=" ";
    $input=socket_read($client, 1024);
    $data.=$input;
} while($input !=" ");
// parse data to extract variables
$obj=json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission) VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:
http://publib.boulder.ibm.com/infocenter/tivihelp/v2r1/index.jsp?topic=/com.ibm.IBMDI.doc/referenceguide259.htm
all of which are hereby expressly incorporated by reference.

Additional embodiments may include:

1. An incremental backup apparatus, comprising:
a memory;
a component collection in the memory, including:
   a dynamically determined difference regions tracking component;
a processor disposed in communication with the memory, and configured to issue a plurality of processing instructions from the component collection stored in the memory,
   wherein the processor issues instructions from the dynamically determined difference regions tracking component, stored in the memory, to:
      detect, via at least one processor, a write command for a data block to write to a data volume of a source device;
      determine, via at least one processor, a data volume address of the data block to write;
      determine, via at least one processor, a superset range associated with the determined data volume address of the data block to write, wherein data blocks of the data volume are divided into superset ranges in a tracking store;
      determine, via at least one processor, whether a written-to flag of the superset range is set in the tracking store;
      upon determining that the written-to flag of the superset range is set in the tracking store:
         determine, via at least one processor, whether the determined data volume address of the data block to write is within a previously established written-to subset range within the superset range; and
         extend, via at least one processor, the previously established written-to subset range within the superset range to include the determined data volume address of the data block to write when it is determined that the determined data volume address of the data block to write is not within the previously established written-to subset range within the superset range;
      upon determining that the written-to flag of the superset range is not set in the tracking store:
         set, via at least one processor, the written-to flag of the superset range in the tracking store; and
         establish, via at least one processor, a new written-to subset range within the superset range, wherein the new written-to subset range includes the determined data volume address of the data block to write;
      execute, via at least one processor, the write command to write the data block to write to the data volume.

2. The apparatus of embodiment 1, wherein data block addresses of each superset range tracked in the tracking store are contiguous, range to range.

3. The apparatus of embodiment 1, wherein a written-to subset range within a superset range is defined by a minimum address and a maximum address, wherein the minimum address is more than or equal to the superset range's start address and the maximum address is less than or equal to the superset range's end address.

4. The apparatus of embodiment 1, wherein the minimum address of the new written-to subset range is equal to the determined data volume address of the data block to write, and the maximum address of the new written-to subset range is equal to the determined data volume address of the data block to write.

5. The apparatus of embodiment 1, wherein the minimum address of the new written-to subset range is equal to the determined data volume address of the data block to write, and the maximum address of the new written-to subset range is equal to the sum of the determined data volume address of the data block to write and a specified look-ahead distance.

6. The apparatus of embodiment 1, further, comprising:
   the processor issues instructions from the dynamically determined difference regions tracking component, stored in the memory, to:
      determine, via at least one processor, that an operating system of the source device was rebooted;
      detect, via at least one processor, that the reboot was subsequent to an ungraceful shut down that resulted in loss of state of a changed block tracking system associated with the data volume;
      determine, via at least one processor, that a written-to flag of an analyzed superset range is set in the tracking store;
      determine, via at least one processor, an analyzed written-to subset range within the analyzed superset range;
      determine, via at least one processor, a source compact data identifier for an analyzed data block, within the analyzed written-to subset range, on the data volume;
      determine, via at least one processor, a backup compact data identifier for a backup data block, corresponding to the analyzed data block, on a backup device; and
      add, via at least one processor, the analyzed data block to a set of changed data blocks when the source compact data identifier and the backup compact data identifier are different.

7. The apparatus of embodiment 6, wherein a compact data identifier is one of: a hash value, a checksum value.

8. The apparatus of embodiment 1, wherein changes to the tracking store are written to the data volume.

9. A processor-readable incremental backup non-transient physical medium storing processor-executable components, the components, comprising:
   a component collection stored in the medium, including:
      a dynamically determined difference regions tracking component;
      wherein the dynamically determined difference regions tracking component, stored in the medium, includes processor-issuable instructions to:
         detect, via at least one processor, a write command for a data block to write to a data volume of a source device;
         determine, via at least one processor, a data volume address of the data block to write;
         determine, via at least one processor, a superset range associated with the determined data volume address of the data block to write, wherein data blocks of the data volume are divided into superset ranges in a tracking store;
         determine, via at least one processor, whether a written-to flag of the superset range is set in the tracking store;
         upon determining that the written-to flag of the superset range is set in the tracking store:
            determine, via at least one processor, whether the determined data volume address of the data block to write is within a previously established written-to subset range within the superset range; and
            extend, via at least one processor, the previously established written-to subset range within the superset range to include the determined data volume address of the data block to write when it is determined that the determined data volume address of the data block to write is not within the previously established written-to subset range within the superset range;
         upon determining that the written-to flag of the superset range is not set in the tracking store:
            set, via at least one processor, the written-to flag of the superset range in the tracking store; and
            establish, via at least one processor, a new written-to subset range within the superset range, wherein the new written-to subset range includes the determined data volume address of the data block to write;
         execute, via at least one processor, the write command to write the data block to write to the data volume.

10. The medium of embodiment 9, wherein data block addresses of each superset range tracked in the tracking store are contiguous, range to range.

11. The medium of embodiment 9, wherein a written-to subset range within a superset range is defined by a minimum address and a maximum address, wherein the minimum address is more than or equal to the superset range's start address and the maximum address is less than or equal to the superset range's end address.

12. The medium of embodiment 9, wherein the minimum address of the new written-to subset range is equal to the determined data volume address of the data block to write, and the maximum address of the new written-to subset range is equal to the determined data volume address of the data block to write.

13. The medium of embodiment 9, wherein the minimum address of the new written-to subset range is equal to the determined data volume address of the data block to write, and the maximum address of the new written-to subset range is equal to the sum of the determined data volume address of the data block to write and a specified look-ahead distance.

14. The medium of embodiment 9, further, comprising:
   the dynamically determined difference regions tracking component, stored in the medium, includes processor-issuable instructions to:
      determine, via at least one processor, that an operating system of the source device was rebooted;
      detect, via at least one processor, that the reboot was subsequent to an ungraceful shut down that resulted in loss of state of a changed block tracking system associated with the data volume;
      determine, via at least one processor, that a written-to flag of an analyzed superset range is set in the tracking store;
      determine, via at least one processor, an analyzed written-to subset range within the analyzed superset range;
      determine, via at least one processor, a source compact data identifier for an analyzed data block, within the analyzed written-to subset range, on the data volume;

determine, via at least one processor, a backup compact data identifier for a backup data block, corresponding to the analyzed data block, on a backup device; and add, via at least one processor, the analyzed data block to a set of changed data blocks when the source compact data identifier and the backup compact data identifier are different.

15. The medium of embodiment 14, wherein a compact data identifier is one of: a hash value, a checksum value.

16. The medium of embodiment 9, wherein changes to the tracking store are written to the data volume.

17. A processor-implemented incremental backup system, comprising:
a dynamically determined difference regions tracking component means, to:
detect, via at least one processor, a write command for a data block to write to a data volume of a source device;
determine, via at least one processor, a data volume address of the data block to write;
determine, via at least one processor, a superset range associated with the determined data volume address of the data block to write, wherein data blocks of the data volume are divided into superset ranges in a tracking store;
determine, via at least one processor, whether a written-to flag of the superset range is set in the tracking store;
upon determining that the written-to flag of the superset range is set in the tracking store:
determine, via at least one processor, whether the determined data volume address of the data block to write is within a previously established written-to subset range within the superset range; and
extend, via at least one processor, the previously established written-to subset range within the superset range to include the determined data volume address of the data block to write when it is determined that the determined data volume address of the data block to write is not within the previously established written-to subset range within the superset range;
upon determining that the written-to flag of the superset range is not set in the tracking store:
set, via at least one processor, the written-to flag of the superset range in the tracking store; and
establish, via at least one processor, a new written-to subset range within the superset range, wherein the new written-to subset range includes the determined data volume address of the data block to write;
execute, via at least one processor, the write command to write the data block to write to the data volume.

18. The system of embodiment 17, wherein data block addresses of each superset range tracked in the tracking store are contiguous, range to range.

19. The system of embodiment 17, wherein a written-to subset range within a superset range is defined by a minimum address and a maximum address, wherein the minimum address is more than or equal to the superset range's start address and the maximum address is less than or equal to the superset range's end address.

20. The system of embodiment 17, wherein the minimum address of the new written-to subset range is equal to the determined data volume address of the data block to write, and the maximum address of the new written-to subset range is equal to the determined data volume address of the data block to write.

21. The system of embodiment 17, wherein the minimum address of the new written-to subset range is equal to the determined data volume address of the data block to write, and the maximum address of the new written-to subset range is equal to the sum of the determined data volume address of the data block to write and a specified look-ahead distance.

22. The system of embodiment 17, further, comprising:
the dynamically determined difference regions tracking component means, to:
determine, via at least one processor, that an operating system of the source device was rebooted;
detect, via at least one processor, that the reboot was subsequent to an ungraceful shut down that resulted in loss of state of a changed block tracking system associated with the data volume;
determine, via at least one processor, that a written-to flag of an analyzed superset range is set in the tracking store;
determine, via at least one processor, an analyzed written-to subset range within the analyzed superset range;
determine, via at least one processor, a source compact data identifier for an analyzed data block, within the analyzed written-to subset range, on the data volume;
determine, via at least one processor, a backup compact data identifier for a backup data block, corresponding to the analyzed data block, on a backup device; and
add, via at least one processor, the analyzed data block to a set of changed data blocks when the source compact data identifier and the backup compact data identifier are different.

23. The system of embodiment 22, wherein a compact data identifier is one of: a hash value, a checksum value.

24. The system of embodiment 17, wherein changes to the tracking store are written to the data volume.

25. A processor-implemented incremental backup method, comprising:
executing processor-implemented dynamically determined difference regions tracking component instructions to:
detect, via at least one processor, a write command for a data block to write to a data volume of a source device;
determine, via at least one processor, a data volume address of the data block to write;
determine, via at least one processor, a superset range associated with the determined data volume address of the data block to write, wherein data blocks of the data volume are divided into superset ranges in a tracking store;
determine, via at least one processor, whether a written-to flag of the superset range is set in the tracking store;
upon determining that the written-to flag of the superset range is set in the tracking store:
determine, via at least one processor, whether the determined data volume address of the data block to write is within a previously established written-to subset range within the superset range; and
extend, via at least one processor, the previously established written-to subset range within the superset range to include the determined data volume address of the data block to write when it is determined that the determined data volume address of the data block to write is not within the previously established written-to subset range within the superset range;
upon determining that the written-to flag of the superset range is not set in the tracking store:
set, via at least one processor, the written-to flag of the superset range in the tracking store; and
establish, via at least one processor, a new written-to subset range within the superset range, wherein the new written-to subset range includes the determined data volume address of the data block to write;
execute, via at least one processor, the write command to write the data block to write to the data volume.

26. The method of embodiment 25, wherein data block addresses of each superset range tracked in the tracking store are contiguous, range to range.

27. The method of embodiment 25, wherein a written-to subset range within a superset range is defined by a minimum address and a maximum address, wherein the minimum address is more than or equal to the superset range's start address and the maximum address is less than or equal to the superset range's end address.

28. The method of embodiment 25, wherein the minimum address of the new written-to subset range is equal to the determined data volume address of the data block to write, and the maximum address of the new written-to subset range is equal to the determined data volume address of the data block to write.

29. The method of embodiment 25, wherein the minimum address of the new written-to subset range is equal to the determined data volume address of the data block to write, and the maximum address of the new written-to subset range is equal to the sum of the determined data volume address of the data block to write and a specified look-ahead distance.

30. The method of embodiment 25, further, comprising:
executing processor-implemented dynamically determined difference regions tracking component instructions to:
determine, via at least one processor, that an operating system of the source device was rebooted;
detect, via at least one processor, that the reboot was subsequent to an ungraceful shut down that resulted in loss of state of a changed block tracking system associated with the data volume;
determine, via at least one processor, that a written-to flag of an analyzed superset range is set in the tracking store;
determine, via at least one processor, an analyzed written-to subset range within the analyzed superset range;
determine, via at least one processor, a source compact data identifier for an analyzed data block, within the analyzed written-to subset range, on the data volume;
determine, via at least one processor, a backup compact data identifier for a backup data block, corresponding to the analyzed data block, on a backup device; and
add, via at least one processor, the analyzed data block to a set of changed data blocks when the source compact data identifier and the backup compact data identifier are different.

31. The method of embodiment 30, wherein a compact data identifier is one of: a hash value, a checksum value.

32. The method of embodiment 25, wherein changes to the tracking store are written to the data volume.

112. An incremental backup apparatus, comprising:
a memory;
a component collection in the memory, including:
a dynamically determined difference regions tracking component;
a processor disposed in communication with the memory, and configured to issue a plurality of processing instructions from the component collection stored in the memory,
wherein the processor issues instructions from the dynamically determined difference regions tracking component, stored in the memory, to:
detect, via at least one processor, a write command for a data block to write to a data volume of a source device;
determine, via at least one processor, a data volume address of the data block to write;
determine, via at least one processor, whether the data volume address of the data block to write is in an existing written-to range in a list of dynamically located ranges data structure stored in a tracking store;
upon determining that the data volume address of the data block to write is in an existing written-to range:
determine, via at least one processor, a new maximum address for the existing written-to range, wherein the new maximum address is equal to the sum of the determined data volume address of the data block to write and a first specified look-ahead distance; and
update, via at least one processor, the existing written-to range to account for the new maximum boundary;
upon determining that the data volume address of the data block to write is not in an existing written-to range:
define, via at least one processor, a new written-to range, wherein the new written-to range is defined by a minimum address and a maximum address, wherein the minimum address is equal to the determined data volume address of the data block to write, and the maximum address is equal to the sum of the determined data volume address of the data block to write and a second specified look-ahead distance;
upon determining that the new written-to range does not exceed a range proximity threshold with regard to any existing neighboring written-to ranges:
add, via at least one processor, the new written-to range to the list of dynamically located ranges data structure;
upon determining that the new written-to range exceeds a range proximity threshold with regard to an existing neighboring written-to range:
extend, via at least one processor, the existing neighboring written-to range to include the new written-to range;
execute, via at least one processor, the write command to write the data block to write to the data volume.

113. The apparatus of embodiment 112, wherein the list of dynamically located ranges data structure is one of: a range tree, a segment tree, an interval tree.

114. The apparatus of embodiment 112, wherein the first specified look-ahead distance and the second specified look-ahead distance are the same.

115. The apparatus of embodiment 112, wherein the first specified look-ahead distance is defined to be equal to the size of a new file, associated with the data block to write, that the file system is expected to create on the data volume.

116. The apparatus of embodiment 112, wherein the second specified look-ahead distance is defined to be equal to the size of an existing file on the data volume, associated with the data block to write, that the file system is expected to modify.

117. The apparatus of embodiment 112, further, comprising:
the processor issues instructions from the dynamically determined difference regions tracking component, stored in the memory, to:
determine, via at least one processor, that an operating system of the source device was rebooted;
detect, via at least one processor, that the reboot was subsequent to an ungraceful shut down that resulted in loss of state of a changed block tracking system associated with the data volume;
determine, via at least one processor, an analyzed written-to range in the list of dynamically located ranges data structure stored in the tracking store;
determine, via at least one processor, a source compact data identifier for an analyzed data block, within the analyzed written-to range, on the data volume;
determine, via at least one processor, a backup compact data identifier for a backup data block, corresponding to the analyzed data block, on a backup device; and
add, via at least one processor, the analyzed data block to a set of changed data blocks when the source compact data identifier and the backup compact data identifier are different.

118. The apparatus of embodiment 117, wherein a compact data identifier is one of: a hash value, a checksum value.

119. The apparatus of embodiment 112, wherein changes to the tracking store are written to the data volume.

120. A processor-readable incremental backup non-transient physical medium storing processor-executable components, the components, comprising:
a component collection stored in the medium, including:
a dynamically determined difference regions tracking component;
wherein the dynamically determined difference regions tracking component, stored in the medium, includes processor-issuable instructions to:
detect, via at least one processor, a write command for a data block to write to a data volume of a source device;
determine, via at least one processor, a data volume address of the data block to write;
determine, via at least one processor, whether the data volume address of the data block to write is in an existing written-to range in a list of dynamically located ranges data structure stored in a tracking store;
upon determining that the data volume address of the data block to write is in an existing written-to range:
determine, via at least one processor, a new maximum address for the existing written-to range, wherein the new maximum address is equal to the sum of the determined data volume address of the data block to write and a first specified look-ahead distance; and
update, via at least one processor, the existing written-to range to account for the new maximum boundary;
upon determining that the data volume address of the data block to write is not in an existing written-to range:
define, via at least one processor, a new written-to range, wherein the new written-to range is defined by a minimum address and a maximum address, wherein the minimum address is equal to the determined data volume address of the data block to write, and the maximum address is equal to the sum of the determined data volume address of the data block to write and a second specified look-ahead distance;
upon determining that the new written-to range does not exceed a range proximity threshold with regard to any existing neighboring written-to ranges:
add, via at least one processor, the new written-to range to the list of dynamically located ranges data structure;
upon determining that the new written-to range exceeds a range proximity threshold with regard to an existing neighboring written-to range:
extend, via at least one processor, the existing neighboring written-to range to include the new written-to range;
execute, via at least one processor, the write command to write the data block to write to the data volume.

121. The medium of embodiment 120, wherein the list of dynamically located ranges data structure is one of: a range tree, a segment tree, an interval tree.

122. The medium of embodiment 120, wherein the first specified look-ahead distance and the second specified look-ahead distance are the same.

123. The medium of embodiment 120, wherein the first specified look-ahead distance is defined to be equal to the size of a new file, associated with the data block to write, that the file system is expected to create on the data volume.

124. The medium of embodiment 120, wherein the second specified look-ahead distance is defined to be equal to the size of an existing file on the data volume, associated with the data block to write, that the file system is expected to modify.

125. The medium of embodiment 120, further, comprising:
the dynamically determined difference regions tracking component, stored in the medium, includes processor-issuable instructions to:
determine, via at least one processor, that an operating system of the source device was rebooted;
detect, via at least one processor, that the reboot was subsequent to an ungraceful shut down that resulted in loss of state of a changed block tracking system associated with the data volume;
determine, via at least one processor, an analyzed written-to range in the list of dynamically located ranges data structure stored in the tracking store;
determine, via at least one processor, a source compact data identifier for an analyzed data block, within the analyzed written-to range, on the data volume;

43 determine, via at least one processor, a backup compact data identifier for a backup data block, corresponding to the analyzed data block, on a backup device; and add, via at least one processor, the analyzed data block to a set of changed data blocks when the source compact data identifier and the backup compact data identifier are different.

126. The medium of embodiment 125, wherein a compact data identifier is one of: a hash value, a checksum value.

127. The medium of embodiment 120, wherein changes to the tracking store are written to the data volume.

128. A processor-implemented incremental backup system, comprising:

a dynamically determined difference regions tracking component means, to:

detect, via at least one processor, a write command for a data block to write to a data volume of a source device;

determine, via at least one processor, a data volume address of the data block to write;

determine, via at least one processor, whether the data volume address of the data block to write is in an existing written-to range in a list of dynamically located ranges data structure stored in a tracking store;

upon determining that the data volume address of the data block to write is in an existing written-to range:

determine, via at least one processor, a new maximum address for the existing written-to range, wherein the new maximum address is equal to the sum of the determined data volume address of the data block to write and a first specified look-ahead distance; and update, via at least one processor, the existing written-to range to account for the new maximum boundary;

upon determining that the data volume address of the data block to write is not in an existing written-to range:

define, via at least one processor, a new written-to range, wherein the new written-to range is defined by a minimum address and a maximum address, wherein the minimum address is equal to the determined data volume address of the data block to write, and the maximum address is equal to the sum of the determined data volume address of the data block to write and a second specified look-ahead distance;

upon determining that the new written-to range does not exceed a range proximity threshold with regard to any existing neighboring written-to ranges:

add, via at least one processor, the new written-to range to the list of dynamically located ranges data structure;

upon determining that the new written-to range exceeds a range proximity threshold with regard to an existing neighboring written-to range:

extend, via at least one processor, the existing neighboring written-to range to include the new written-to range;

execute, via at least one processor, the write command to write the data block to write to the data volume.

129. The system of embodiment 128, wherein the list of dynamically located ranges data structure is one of: a range tree, a segment tree, an interval tree.

44

130. The system of embodiment 128, wherein the first specified look-ahead distance and the second specified look-ahead distance are the same.

131. The system of embodiment 128, wherein the first specified look-ahead distance is defined to be equal to the size of a new file, associated with the data block to write, that the file system is expected to create on the data volume.

132. The system of embodiment 128, wherein the second specified look-ahead distance is defined to be equal to the size of an existing file on the data volume, associated with the data block to write, that the file system is expected to modify.

133. The system of embodiment 128, further, comprising:

the dynamically determined difference regions tracking component means, to:

determine, via at least one processor, that an operating system of the source device was rebooted;

detect, via at least one processor, that the reboot was subsequent to an ungraceful shut down that resulted in loss of state of a changed block tracking system associated with the data volume;

determine, via at least one processor, an analyzed written-to range in the list of dynamically located ranges data structure stored in the tracking store;

determine, via at least one processor, a source compact data identifier for an analyzed data block, within the analyzed written-to range, on the data volume;

determine, via at least one processor, a backup compact data identifier for a backup data block, corresponding to the analyzed data block, on a backup device; and add, via at least one processor, the analyzed data block to a set of changed data blocks when the source compact data identifier and the backup compact data identifier are different.

134. The system of embodiment 133, wherein a compact data identifier is one of: a hash value, a checksum value.

135. The system of embodiment 128, wherein changes to the tracking store are written to the data volume.

136. A processor-implemented incremental backup method, comprising:

executing processor-implemented dynamically determined difference regions tracking component instructions to:

detect, via at least one processor, a write command for a data block to write to a data volume of a source device;

determine, via at least one processor, a data volume address of the data block to write;

determine, via at least one processor, whether the data volume address of the data block to write is in an existing written-to range in a list of dynamically located ranges data structure stored in a tracking store;

upon determining that the data volume address of the data block to write is in an existing written-to range:

determine, via at least one processor, a new maximum address for the existing written-to range, wherein the new maximum address is equal to the sum of the determined data volume address of the data block to write and a first specified look-ahead distance; and update, via at least one processor, the existing written-to range to account for the new maximum boundary;

upon determining that the data volume address of the data block to write is not in an existing written-to range:
  define, via at least one processor, a new written-to range, wherein the new written-to range is defined by a minimum address and a maximum address, wherein the minimum address is equal to the determined data volume address of the data block to write, and the maximum address is equal to the sum of the determined data volume address of the data block to write and a second specified look-ahead distance;
  upon determining that the new written-to range does not exceed a range proximity threshold with regard to any existing neighboring written-to ranges:
    add, via at least one processor, the new written-to range to the list of dynamically located ranges data structure;
  upon determining that the new written-to range exceeds a range proximity threshold with regard to an existing neighboring written-to range:
    extend, via at least one processor, the existing neighboring written-to range to include the new written-to range;
  execute, via at least one processor, the write command to write the data block to write to the data volume.

137. The method of embodiment 136, wherein the list of dynamically located ranges data structure is one of: a range tree, a segment tree, an interval tree.

138. The method of embodiment 136, wherein the first specified look-ahead distance and the second specified look-ahead distance are the same.

139. The method of embodiment 136, wherein the first specified look-ahead distance is defined to be equal to the size of a new file, associated with the data block to write, that the file system is expected to create on the data volume.

140. The method of embodiment 136, wherein the second specified look-ahead distance is defined to be equal to the size of an existing file on the data volume, associated with the data block to write, that the file system is expected to modify.

141. The method of embodiment 136, further, comprising:
  executing processor-implemented dynamically determined difference regions tracking component instructions to:
    determine, via at least one processor, that an operating system of the source device was rebooted;
    detect, via at least one processor, that the reboot was subsequent to an ungraceful shut down that resulted in loss of state of a changed block tracking system associated with the data volume;
    determine, via at least one processor, an analyzed written-to range in the list of dynamically located ranges data structure stored in the tracking store;
    determine, via at least one processor, a source compact data identifier for an analyzed data block, within the analyzed written-to range, on the data volume;
    determine, via at least one processor, a backup compact data identifier for a backup data block, corresponding to the analyzed data block, on a backup device; and
    add, via at least one processor, the analyzed data block to a set of changed data blocks when the source compact data identifier and the backup compact data identifier are different.

142. The method of embodiment 141, wherein a compact data identifier is one of: a hash value, a checksum value.

143. The method of embodiment 136, wherein changes to the tracking store are written to the data volume.

In order to address various issues and advance the art, the entirety of this application for Dynamically Determined Difference Regions Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DDDR individual and/or enterprise user, database configuration and/or relational model, data type, data transmission and/or network framework, syntax structure, and/or the like, various embodiments of the DDDR, may be implemented that allow a great deal of flexibility and customization. For example, aspects of the DDDR may be adapted for storage management systems. While various embodiments and discussions of the DDDR have included backup systems, however, it is to be understood that the embodiments described herein may be readily configured and/or customized for a wide variety of other applications and/or implementations.

What is claimed is:

1. An incremental backup apparatus, comprising:
a memory;
a component collection in the memory, including:
a dynamically determined difference regions tracking component;
a processor disposed in communication with the memory, and configured to issue a plurality of processing instructions from the component collection stored in the memory,
wherein the processor issues instructions from the dynamically determined difference regions tracking component, stored in the memory, to:
detect, via at least one processor, a write command for a data block to write to a data volume of a source device;
determine, via at least one processor, a data volume address of the data block to write;
determine, via at least one processor, a superset range associated with the determined data volume address of the data block to write, wherein data blocks of the data volume are divided into superset ranges in a tracking store;
determine, via at least one processor, whether a written-to flag of the superset range is set in the tracking store;
upon determining that the written-to flag of the superset range is set in the tracking store:
determine, via at least one processor, whether the determined data volume address of the data block to write is within a previously established written-to subset range within the superset range; and
extend, via at least one processor, the previously established written-to subset range within the superset range to include the determined data volume address of the data block to write when it is determined that the determined data volume address of the data block to write is not within the previously established written-to subset range within the superset range;
upon determining that the written-to flag of the superset range is not set in the tracking store:
set, via at least one processor, the written-to flag of the superset range in the tracking store; and
establish, via at least one processor, a new written-to subset range within the superset range, wherein the new written-to subset range includes the determined data volume address of the data block to write;
execute, via at least one processor, the write command to write the data block to write to the data volume.

2. The apparatus of claim 1, wherein data block addresses of each superset range tracked in the tracking store are contiguous, range to range.

3. The apparatus of claim 1, wherein a written-to subset range within a superset range is defined by a minimum address and a maximum address, wherein the minimum address is more than or equal to the superset range's start address and the maximum address is less than or equal to the superset range's end address.

4. The apparatus of claim 1, wherein the minimum address of the new written-to subset range is equal to the determined data volume address of the data block to write, and the maximum address of the new written-to subset range is equal to the determined data volume address of the data block to write.

5. The apparatus of claim 1, wherein the minimum address of the new written-to subset range is equal to the determined data volume address of the data block to write, and the maximum address of the new written-to subset range is equal to the sum of the determined data volume address of the data block to write and a specified look-ahead distance.

6. The apparatus of claim 1, further, comprising:
the processor issues instructions from the dynamically determined difference regions tracking component, stored in the memory, to:
determine, via at least one processor, that an operating system of the source device was rebooted;
detect, via at least one processor, that the reboot was subsequent to an ungraceful shut down that resulted in loss of state of a changed block tracking system associated with the data volume;
determine, via at least one processor, that a written-to flag of an analyzed superset range is set in the tracking store;
determine, via at least one processor, an analyzed written-to subset range within the analyzed superset range;
determine, via at least one processor, a source compact data identifier for an analyzed data block, within the analyzed written-to subset range, on the data volume;
determine, via at least one processor, a backup compact data identifier for a backup data block, corresponding to the analyzed data block, on a backup device; and
add, via at least one processor, the analyzed data block to a set of changed data blocks when the source compact data identifier and the backup compact data identifier are different.

7. The apparatus of claim 6, wherein a compact data identifier is one of: a hash value, a checksum value.

8. The apparatus of claim 1, wherein changes to the tracking store are written to the data volume.

9. A processor-readable incremental backup non-transient physical medium storing processor-executable components, the components, comprising:
a component collection stored in the medium, including:
a dynamically determined difference regions tracking component;

wherein the dynamically determined difference regions tracking component, stored in the medium, includes processor-issuable instructions to:

detect, via at least one processor, a write command for a data block to write to a data volume of a source device;

determine, via at least one processor, a data volume address of the data block to write;

determine, via at least one processor, a superset range associated with the determined data volume address of the data block to write, wherein data blocks of the data volume are divided into superset ranges in a tracking store;

determine, via at least one processor, whether a written-to flag of the superset range is set in the tracking store;

upon determining that the written-to flag of the superset range is set in the tracking store:

determine, via at least one processor, whether the determined data volume address of the data block to write is within a previously established written-to subset range within the superset range; and extend, via at least one processor, the previously established written-to subset range within the superset range to include the determined data volume address of the data block to write when it is determined that the determined data volume address of the data block to write is not within the previously established written-to subset range within the superset range;

upon determining that the written-to flag of the superset range is not set in the tracking store:

set, via at least one processor, the written-to flag of the superset range in the tracking store; and establish, via at least one processor, a new written-to subset range within the superset range, wherein the new written-to subset range includes the determined data volume address of the data block to write;

execute, via at least one processor, the write command to write the data block to write to the data volume.

10. A processor-implemented incremental backup system, comprising:

a dynamically determined difference regions tracking component means, to:

detect, via at least one processor, a write command for a data block to write to a data volume of a source device;

determine, via at least one processor, a data volume address of the data block to write;

determine, via at least one processor, a superset range associated with the determined data volume address of the data block to write, wherein data blocks of the data volume are divided into superset ranges in a tracking store;

determine, via at least one processor, whether a written-to flag of the superset range is set in the tracking store;

upon determining that the written-to flag of the superset range is set in the tracking store:

determine, via at least one processor, whether the determined data volume address of the data block to write is within a previously established written-to subset range within the superset range; and extend, via at least one processor, the previously established written-to subset range within the superset range to include the determined data volume address of the data block to write when it is determined that the determined data volume address of the data block to write is not within the previously established written-to subset range within the superset range;

upon determining that the written-to flag of the superset range is not set in the tracking store:

set, via at least one processor, the written-to flag of the superset range in the tracking store; and establish, via at least one processor, a new written-to subset range within the superset range, wherein the new written-to subset range includes the determined data volume address of the data block to write;

execute, via at least one processor, the write command to write the data block to write to the data volume.

11. A processor-implemented incremental backup method, comprising:

executing processor-implemented dynamically determined difference regions tracking component instructions to:

detect, via at least one processor, a write command for a data block to write to a data volume of a source device;

determine, via at least one processor, a data volume address of the data block to write;

determine, via at least one processor, a superset range associated with the determined data volume address of the data block to write, wherein data blocks of the data volume are divided into superset ranges in a tracking store;

determine, via at least one processor, whether a written-to flag of the superset range is set in the tracking store;

upon determining that the written-to flag of the superset range is set in the tracking store:

determine, via at least one processor, whether the determined data volume address of the data block to write is within a previously established written-to subset range within the superset range; and extend, via at least one processor, the previously established written-to subset range within the superset range to include the determined data volume address of the data block to write when it is determined that the determined data volume address of the data block to write is not within the previously established written-to subset range within the superset range;

upon determining that the written-to flag of the superset range is not set in the tracking store:

set, via at least one processor, the written-to flag of the superset range in the tracking store; and establish, via at least one processor, a new written-to subset range within the superset range, wherein the new written-to subset range includes the determined data volume address of the data block to write;

execute, via at least one processor, the write command to write the data block to write to the data volume.

12. An incremental backup apparatus, comprising:

a memory;

a component collection in the memory, including:

a dynamically determined difference regions tracking component;

a processor disposed in communication with the memory, and configured to issue a plurality of processing instructions from the component collection stored in the memory, wherein the processor issues instructions from the dynamically determined difference regions tracking component, stored in the memory, to:

detect, via at least one processor, a write command for a data block to write to a data volume of a source device;

determine, via at least one processor, a data volume address of the data block to write;

determine, via at least one processor, whether the data volume address of the data block to write is in an existing written-to range in a list of dynamically located ranges data structure stored in a tracking store;

upon determining that the data volume address of the data block to write is in an existing written-to range:
determine, via at least one processor, a new maximum address for the existing written-to range, wherein the new maximum address is equal to the sum of the determined data volume address of the data block to write and a first specified look-ahead distance; and
update, via at least one processor, the existing written-to range to account for the new maximum boundary;
upon determining that the data volume address of the data block to write is not in an existing written-to range:
define, via at least one processor, a new written-to range, wherein the new written-to range is defined by a minimum address and a maximum address, wherein the minimum address is equal to the determined data volume address of the data block to write, and the maximum address is equal to the sum of the determined data volume address of the data block to write and a second specified look-ahead distance;
upon determining that the new written-to range does not exceed a range proximity threshold with regard to any existing neighboring written-to ranges:
add, via at least one processor, the new written-to range to the list of dynamically located ranges data structure;
upon determining that the new written-to range exceeds a range proximity threshold with regard to an existing neighboring written-to range:
extend, via at least one processor, the existing neighboring written-to range to include the new written-to range;
execute, via at least one processor, the write command to write the data block to write to the data volume.

13. The apparatus of claim 12, wherein the list of dynamically located ranges data structure is one of:
a range tree, a segment tree, an interval tree.

14. The apparatus of claim 12, wherein the first specified look-ahead distance and the second specified look-ahead distance are the same.

15. The apparatus of claim 12, wherein the first specified look-ahead distance is defined to be equal to the size of a new file, associated with the data block to write, that the file system is expected to create on the data volume.

16. The apparatus of claim 12, wherein the second specified look-ahead distance is defined to be equal to the size of an existing file on the data volume, associated with the data block to write, that the file system is expected to modify.

17. The apparatus of claim 12, further, comprising:
the processor issues instructions from the dynamically determined difference regions tracking component, stored in the memory, to:
determine, via at least one processor, that an operating system of the source device was rebooted;
detect, via at least one processor, that the reboot was subsequent to an ungraceful shut down that resulted in loss of state of a changed block tracking system associated with the data volume;
determine, via at least one processor, an analyzed written-to range in the list of dynamically located ranges data structure stored in the tracking store;
determine, via at least one processor, a source compact data identifier for an analyzed data block, within the analyzed written-to range, on the data volume;
determine, via at least one processor, a backup compact data identifier for a backup data block, corresponding to the analyzed data block, on a backup device; and
add, via at least one processor, the analyzed data block to a set of changed data blocks when the source compact data identifier and the backup compact data identifier are different.

18. The apparatus of claim 17, wherein a compact data identifier is one of: a hash value, a checksum value.

19. The apparatus of claim 12, wherein changes to the tracking store are written to the data volume.

20. A processor-readable incremental backup non-transient physical medium storing processor-executable components, the components, comprising:
a component collection stored in the medium, including:
a dynamically determined difference regions tracking component;
wherein the dynamically determined difference regions tracking component, stored in the medium, includes processor-issuable instructions to:
detect, via at least one processor, a write command for a data block to write to a data volume of a source device;
determine, via at least one processor, a data volume address of the data block to write;
determine, via at least one processor, whether the data volume address of the data block to write is in an existing written-to range in a list of dynamically located ranges data structure stored in a tracking store;
upon determining that the data volume address of the data block to write is in an existing written-to range:
determine, via at least one processor, a new maximum address for the existing written-to range, wherein the new maximum address is equal to the sum of the determined data volume address of the data block to write and a first specified look-ahead distance; and
update, via at least one processor, the existing written-to range to account for the new maximum boundary;
upon determining that the data volume address of the data block to write is not in an existing written-to range:
define, via at least one processor, a new written-to range, wherein the new written-to range is defined by a minimum address and a maximum address, wherein the minimum address is equal to the determined data volume address of the data block to write, and the maximum address is equal to the sum of the determined data volume address of the data block to write and a second specified look-ahead distance;
upon determining that the new written-to range does not exceed a range proximity threshold with regard to any existing neighboring written-to ranges:
add, via at least one processor, the new written-to range to the list of dynamically located ranges data structure;
upon determining that the new written-to range exceeds a range proximity threshold with regard to an existing neighboring written-to range:
extend, via at least one processor, the existing neighboring written-to range to include the new written-to range;
execute, via at least one processor, the write command to write the data block to write to the data volume.

21. A processor-implemented incremental backup system, comprising:
a dynamically determined difference regions tracking component means, to:
detect, via at least one processor, a write command for a data block to write to a data volume of a source device;
determine, via at least one processor, a data volume address of the data block to write;
determine, via at least one processor, whether the data volume address of the data block to write is in an existing written-to range in a list of dynamically located ranges data structure stored in a tracking store;

upon determining that the data volume address of the data block to write is in an existing written-to range:

determine, via at least one processor, a new maximum address for the existing written-to range, wherein the new maximum address is equal to the sum of the determined data volume address of the data block to write and a first specified look-ahead distance; and update, via at least one processor, the existing written-to range to account for the new maximum boundary;

upon determining that the data volume address of the data block to write is not in an existing written-to range:

define, via at least one processor, a new written-to range, wherein the new written-to range is defined by a minimum address and a maximum address, wherein the minimum address is equal to the determined data volume address of the data block to write, and the maximum address is equal to the sum of the determined data volume address of the data block to write and a second specified look-ahead distance;

upon determining that the new written-to range does not exceed a range proximity threshold with regard to any existing neighboring written-to ranges:

add, via at least one processor, the new written-to range to the list of dynamically located ranges data structure;

upon determining that the new written-to range exceeds a range proximity threshold with regard to an existing neighboring written-to range:

extend, via at least one processor, the existing neighboring written-to range to include the new written-to range;

execute, via at least one processor, the write command to write the data block to write to the data volume.

22. A processor-implemented incremental backup method, comprising:

executing processor-implemented dynamically determined difference regions tracking component instructions to:

detect, via at least one processor, a write command for a data block to write to a data volume of a source device;

determine, via at least one processor, a data volume address of the data block to write;

determine, via at least one processor, whether the data volume address of the data block to write is in an existing written-to range in a list of dynamically located ranges data structure stored in a tracking store;

upon determining that the data volume address of the data block to write is in an existing written-to range:

determine, via at least one processor, a new maximum address for the existing written-to range, wherein the new maximum address is equal to the sum of the determined data volume address of the data block to write and a first specified look-ahead distance; and update, via at least one processor, the existing written-to range to account for the new maximum boundary;

upon determining that the data volume address of the data block to write is not in an existing written-to range:

define, via at least one processor, a new written-to range, wherein the new written-to range is defined by a minimum address and a maximum address, wherein the minimum address is equal to the determined data volume address of the data block to write, and the maximum address is equal to the sum of the determined data volume address of the data block to write and a second specified look-ahead distance;

upon determining that the new written-to range does not exceed a range proximity threshold with regard to any existing neighboring written-to ranges:

add, via at least one processor, the new written-to range to the list of dynamically located ranges data structure;

upon determining that the new written-to range exceeds a range proximity threshold with regard to an existing neighboring written-to range:

extend, via at least one processor, the existing neighboring written-to range to include the new written-to range;

execute, via at least one processor, the write command to write the data block to write to the data volume.

\* \* \* \* \*